(12) United States Patent
Makuta et al.

(10) Patent No.: US 8,011,776 B2
(45) Date of Patent: Sep. 6, 2011

(54) INKJET-RECORDING INK SET, INKJET-RECORDING INK AND INKJET IMAGE-RECORDING METHOD

(75) Inventors: Toshiyuki Makuta, Ashigarakami-gun (JP); Shigetomo Tsujihata, Ashigarakami-gun (JP); Masaaki Konno, Ashigarakami-gun (JP); Tetsuzo Kadomatsu, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 295 days.

(21) Appl. No.: 11/887,228

(22) PCT Filed: Mar. 31, 2006

(86) PCT No.: PCT/JP2006/307400
§ 371 (c)(1),
(2), (4) Date: Sep. 27, 2007

(87) PCT Pub. No.: WO2006/104278
PCT Pub. Date: Oct. 5, 2006

(65) Prior Publication Data
US 2009/0289973 A1      Nov. 26, 2009

(30) Foreign Application Priority Data

| Mar. 31, 2005 | (JP) | 2005-105144 |
| Apr. 6, 2005 | (JP) | 2005-110291 |
| Jan. 23, 2006 | (JP) | 2006-014292 |

(51) Int. Cl.
*G01D 11/00*      (2006.01)

(52) U.S. Cl. .......................... 347/100; 347/95; 347/96

(58) Field of Classification Search .................. 347/100, 347/95, 96, 101; 106/31.13, 31.6, 31.27; 523/160

See application file for complete search history.

(56) References Cited

U.S. PATENT DOCUMENTS

| 5,948,512 A * | 9/1999 | Kubota et al. ............... 428/195.1 |
| 6,521,031 B2 * | 2/2003 | Kimura et al. ............... 106/31.47 |
| 2003/0021961 A1 | 1/2003 | Ylitalo et al. |
| 2003/0069329 A1 | 4/2003 | Kubota et al. |
| 2003/0085974 A1 * | 5/2003 | Shimomura et al. .......... 347/101 |
| 2006/0012627 A1 * | 1/2006 | Nakazawa et al. ............ 347/21 |

FOREIGN PATENT DOCUMENTS

| EP | 1125760 A1 | 8/2001 |
| JP | 63-060783 A | 3/1988 |
| JP | 5-214279 A | 8/1993 |
| JP | 8-174997 A | 7/1996 |
| JP | 10-287035 | * 10/1998 |
| JP | 10-287035 A | 10/1998 |
| JP | 2001-115067 A | 4/2001 |
| JP | 2001-348519 A | 12/2001 |
| JP | 2002-225415 A | 8/2002 |
| JP | 3478495 B | 10/2003 |
| WO | WO 02/085638 A1 | 10/2002 |

* cited by examiner

*Primary Examiner* — Manish S Shah
(74) *Attorney, Agent, or Firm* — Sheldon J. Moss; Chad M. Herring

(57) ABSTRACT

The present invention provides an inkjet-recording ink set including multiple kinds of liquid including at least first and second liquids, wherein the first liquid contains a metal compound dissolved therein, and at least one of the multiple kinds of liquid contains a polymerizable compound. The invention also provides an inkjet-recording ink including at least a high-boiling-point organic solvent and a metal compound. The multiple kinds of liquid contain substantially no water and no low-boiling-point organic solvent.

16 Claims, No Drawings

US 8,011,776 B2

INKJET-RECORDING INK SET, INKJET-RECORDING INK AND INKJET IMAGE-RECORDING METHOD

TECHNICAL FIELD

The present invention relates to an inkjet-recording ink set, an inkjet-recording ink and an inkjet image-recording method, and in particular, to an inkjet-recording ink set and an inkjet-recording ink used for an inkjet image-recording method by multi-liquid aggregation and to an inkjet image-recording method allowing formation of a high-quality image.

BACKGROUND ART

Inkjet systems have been used in many printers because the system can be configured with a compact and inexpensive device and because images can be formed on recording media in a non-contact manner. In inkjet systems, ink is ejected from an ink-ejecting opening such as a nozzle. Among inkjet systems, piezo-inkjet systems and thermal-inkjet systems enable high resolution and high speed printing. The piezo-inkjet systems utilize deformation of piezoelectric elements to eject ink and the thermal-inkjet systems utilize boiling of ink caused by application of thermal energy to eject ink.

Currently, it has become important to increase the processing speed and improve the image quality during printing on plain paper or non-water-absorbing recording media such as plastics by inkjet printers. In particular, prolonged drying time for droplets after printing causes practical problems such as a tendency for image bleeding to occur. And not only does interference between ejected droplets due to intermixing between adjacently ejected ink droplets occur, thereby inhibiting formation of sharp images, it is also necessary to dry the printed media without stacking immediately after printing because the solvent drying speed is extremely low when non-water-absorbing recording media are used. The interference between ejected droplets is a phenomenon wherein adjacently ejected droplets fuse with each other in order to reduce surface energy (reduce surface area). When the adjacent droplets fuse with each other, the positions of the droplets are shifted from the initial ejected positions, causing unevenness of line width especially when thin lines are drawn with colorant-containing ink and unevenness appears when a surface is drawn.

For prevention of image bleeding and interference between ejected droplets, an inkjet ink that is cured and fixed not by vaporization of its ink solvent but by radiation is proposed as a method of accelerating ink curing (e.g., JP-A No. 5-214279). The ink often has a problem of insufficient storage stability, because undesirable polymerization reactions often occur easily during storage due to coexistence of polymerizable compounds and polymerization initiators.

Methods of using a two-liquid type ink and allowing the two liquids to react on a recording medium are proposed for improvement in both storage stability and drying speed. Examples of such methods include a method of applying a liquid containing a basic polymer and then an ink containing an anionic dye (e.g., JP-A No. 63-60783), a method of applying a liquid composition containing a cationic substance and then an ink containing an anionic compound and a colorant (e.g., JP-A No. 8-174997), and a recording method of using two inks, one containing a photo-curing resin and the other containing a photopolymerization initiator (e.g., Japanese Patent No. 3478495).

However, these methods, which are aimed at suppressing image bleeding by precipitation of the dye itself, are not effective in suppressing interference between ejected droplets and lowering drying speed because of using an aqueous solvent. Also there are concerns about deterioration in image quality because the precipitated dye is easily distributed unevenly on the recording medium.

DISCLOSURE OF INVENTION

The present invention has been made in view of the above circumstances and provides an inkjet-recording ink set and an inkjet-recording ink.

One aspect of the invention provides an inkjet-recording ink set comprising multiple kinds of liquid including at least first and second liquids, wherein the first liquid contains a metal compound dissolved therein, and at least one of the multiple kinds of liquid contains a polymerizable compound.

Another aspect of the invention provides an inkjet-recording ink comprising at least a high-boiling-point organic solvent and a metal compound.

BEST MODE FOR CARRYING OUT THE INVENTION

First embodiment of the invention is an inkjet-recording ink set comprising multiple kinds of liquid including at least first and second liquids, wherein the first liquid contains a metal compound dissolved therein, and at least one of the multiple kinds of liquid contains a polymerizable compound.

Second embodiment of the invention is an inkjet image-recording method using the inkjet-recording ink set of the first embodiment of the invention, the method comprising applying the first and second liquids onto a recording medium simultaneously or sequentially in such a manner that both the liquids are brought into contact with each other to thereby form an image.

Third embodiment of the invention is an inkjet-recording ink comprising at least a high-boiling-point organic solvent and a metal compound.

Hereinafter, the inkjet-recording ink set (the first embodiment of the invention), the inkjet-recording ink (the third embodiment of the invention) and the inkjet image-recording method (the second embodiment of the invention) are described in this order.

<Inkjet-Recording Ink Set: the First Embodiment of the Invention>

The inkjet-recording ink set according to the invention (hereinafter, often referred to simply as "ink set") is an inkjet-recording ink set comprising multiple kinds of liquid including at least first and second liquids, wherein the first liquid contains a metal compound dissolved therein, and at least one of the multiple kinds of liquid contains a polymerizable compound.

The term "dissolved" means that the metal compound is dissolved in the first liquid at 25° C. at a concentration of 0.05 g/cm³ or more. For dissolving the metal compound according to the invention in the first liquid in this manner, the first liquid is preferably oily as it is, and, if the first liquid contains a solvent, the first liquid preferably contains a high-boiling-point organic solvent as the solvent and substantially no water-soluble solvent.

By using the first liquid as described above, the metal compound contained therein suppresses diffusion of the colorant on the recording medium. As a result, bleeding and interference between ejected droplets can be effectively suppressed, and an image without color separation can be obtained.

In order that the metal compound suppresses diffusion of the colorant on the recording medium in the invention, it is preferable that the metal compound and the colorant are respectively contained in different liquids, it is preferable that the first liquid containing the metal compound contains substantially no colorant, and it is preferable that the second liquid contains a colorant. Therefore, it is preferable that the second liquid containing the colorant contains substantially no metal compound.

The second liquid preferably contains a polymerizable compound. It is also preferable that both the first and second liquids contain a polymerizable compound, because the liquids become more compatible with each other.

In addition, in the invention, at least one of the multiple kinds of liquid (including the first and second liquids) which are included in the ink set preferably contains a polymerization initiator for curing a polymerizable compound, from the viewpoint of obtaining a superior fixability. The polymerization initiator is preferably contained in a liquid containing no polymerizable compound, from the viewpoint of the storage stability of the liquid.

Hereinafter, the invention will be described in detail, and components for the multiple kinds of liquid will be described first.

[Metal Compound]

In the invention, the first liquid contains a metal compound. Since it is thought that the metal compound suppresses diffusion of the colorant on the recording medium as described above, bleeding and interference between ejected droplets are effectively suppressed by applying the first and second liquids satisfying the conditions above.

Examples of the metal compounds include metal salts of aliphatic carboxylic acids (e.g., acetic acid, propionic acid, butyric acid, valeric acid, iso-valeric acid, pivalic acid, lauric acid, myristic acid, palmitic acid, stearic acid, 2-ethylhexanoic acid, lactic acid, pyruvic acid, etc.), metal salts of aromatic carboxylic acids (e.g., benzoic acid, salicylic acid, phthalic acid, cinnamic acid, etc.), metal salts of aliphatic sulfonic acids (e.g., methanesulfonic acid, ethanesulfonic acid, propanesulfonic acid, hexanesulfonic acid, 2-ethylhexanesulfonic acid, etc.), metal salts of aromatic sulfonic acids (benzene sulfonic acid, naphthalenesulfonic acid, etc.), and 1,3-diketone metal compounds; and among them, metal salts of aliphatic carboxylic acids and 1,3-diketone metal compounds are preferable.

The aliphatic carboxylic acid may be linear, branched, or cyclic and preferably has 2 to 40 carbon atoms and more preferably 6 to 25 carbon atoms. The acid may have a substituent group, and examples of the substituent groups include aryl groups, alkoxy groups, aryloxy groups, halogen atoms, a hydroxyl group, carbamoyl groups, amino groups, a carboxy group, and the like.

Favorable examples of the aryl groups as the substituent groups include a phenyl group, alkylphenyl groups (e.g., methylphenyl, ethylphenyl, n-propylphenyl, n-butylphenyl, cumenyl, mesityl, toluoyl, and xylyl), a naphthyl group, a fluorophenyl group, a dichlorophenyl group, a trichlorophenyl group, a bromophenyl group, a hydroxyphenyl group, a methoxyphenyl group, an acetoxyphenyl group, a cyanophenyl group, and the like; and phenyl and naphthyl groups are more preferable.

Favorable examples of the alkoxy groups as the substituent groups include methoxy, ethoxy, propoxy, isopropoxy, butoxy, t-butoxy, hexyloxy, cyclohexyloxy, 2-ethylhexyloxy, octyloxy, and dodecyloxy groups, and more preferable examples include methoxy, ethoxy, propoxy, isopropoxy, butoxy, and t-butoxy groups.

Favorable examples of the aryloxy groups as the substituent groups include phenoxy, methylphenoxy, ethylphenoxy, cumenyloxy, tolyloxy, xylyloxy, naphthyloxy, chlorophenoxy, hydroxyphenoxy, methoxyphenoxy, and acetoxyphenoxy groups, and more preferably is a phenoxy group.

Examples of the halogen atoms as the substituent groups include fluorine, chlorine, bromine, and iodine atoms.

Favorable examples of the carbamoyl groups as the substituent groups include a carbamoyl group, alkylcarbamoyl groups (e.g., methylcarbamoyl, ethylcarbamoyl, propylcarbamoyl, and butylcarbamoyl), and arylcarbamoyl groups (e.g., pheylcarbamoyl); and carbamoyl, methylcarbamoyl, and ethylcarbamoyl groups are more preferable.

Favorable examples of the amino groups as the substituent groups include primary amino groups, N-substituted amino groups (e.g., N-methylamino, N-ethylamino, N-propylamino, N-butylamino, N-hexylamino, N-octylamino, and N-benzylamino groups), N,N-di-substituted amino groups (e.g., N,N-dimethylamino, N,N-diethylamino, N-methyl-N-ethylamino, N,N-dibutylamino, N-ethyl-N-octylamino, and N-methyl-N-benzylamino groups); and N-methylamino, N-ethylamino, N,N-dimethylamino, N,N-diethylamino, and N-methyl-N-ethylamino groups are more preferable.

The aliphatic carboxylic acid is particularly preferably n-hexanoic acid, 2-ethylhexanoic acid, n-octanoic acid, laurylic acid, myristic acid, palmitic acid, stearic acid, or 2-ethylhexanoic acid. In addition, ethylenediaminetetraacetic acid is also included in the preferable examples.

The 1,3-diketone may be linear, branched, or cyclic and preferably has 5 to 40 carbon atoms and more preferably 5 to 25 carbon atoms. Examples thereof include 2,4-pentadione, 3,5-heptadione, 2,2,6,6-tetramethylheptadione, 4,6-nonadione, 7,9-pentadecadione, 2,4-dimethyl-7,9-pentadecadione, 2-acetylcyclopentanone, 2-acetylcyclohexanone, 3-methyl-2,4-pentadione, 3-(2-ethylhexyl)2,4-pentadione, 3-[4-(2-ethylhexyloxy)benzyl]-2,4-pentadione, and the like; and 2,4-pentadione, 7,9-pentadecadione, and 3-[4-(2-ethylhexyloxy)benzyl]-2,4-pentadione are preferable.

These groups may have an additional substituent group, and examples of the substituent groups include aryl groups, alkoxy groups, aryloxy groups, halogen atoms, a hydroxyl group, carbamoyl groups, amino groups, carboxy groups, and the like. More favorable substituent groups thereof, i.e., aryl, alkoxy, aryloxy, halogen atoms, hydroxyl, carbamoyl, and amino groups, are the same as those for the aliphatic carboxylic acid mentioned above.

The metal in the metal compound is preferably a metal selected from the group consisting of zinc, aluminum, calcium, magnesium, iron, cobalt, nickel, and copper; among them, zinc, aluminum, and nickel are preferable; and zinc is particularly preferable.

Metal salts of aliphatic carboxylic acids favorable in the invention include the followings:

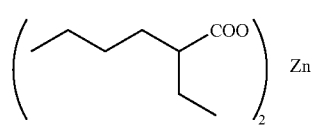

1-1

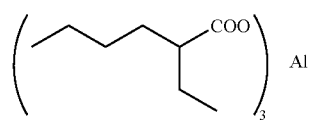 1-2
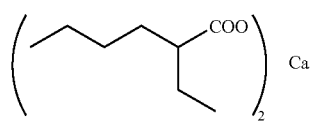 1-3
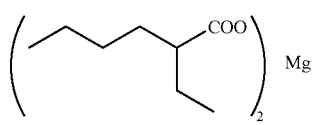 1-4
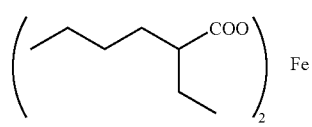 1-5
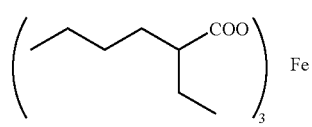 1-6
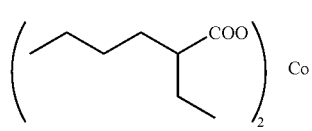 1-7
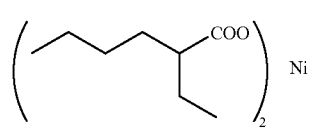 1-8
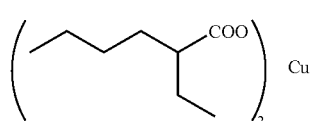 1-9
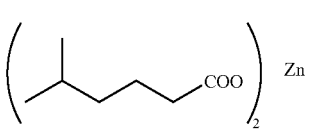 1-10
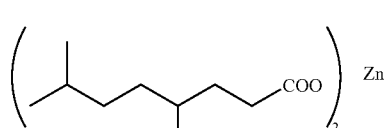 1-11
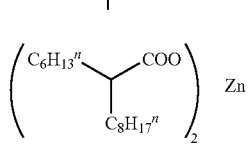 1-12
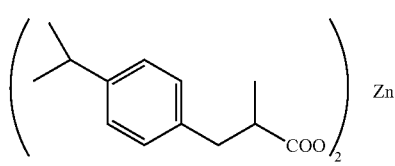 1-13
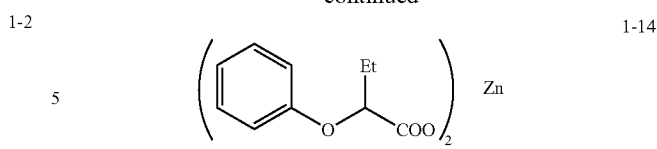 1-14
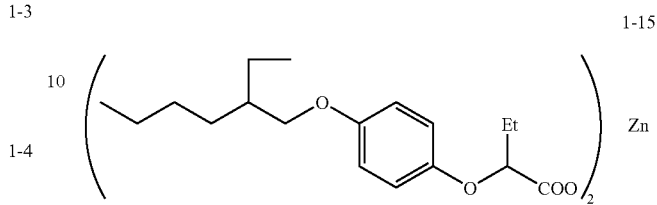 1-15
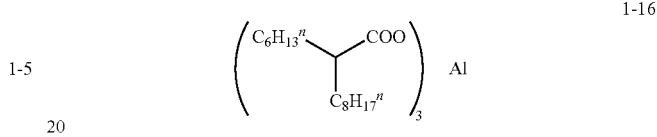 1-16
In addition, 1,3-diketone metal compounds favorable in the invention include the following specific examples:
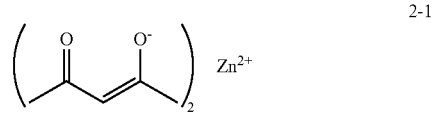 2-1
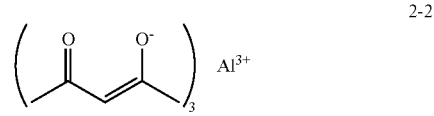 2-2
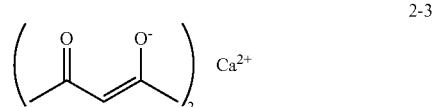 2-3
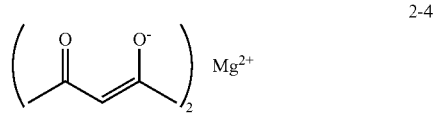 2-4
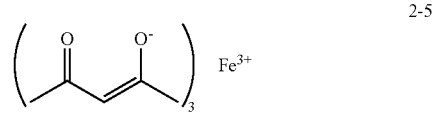 2-5
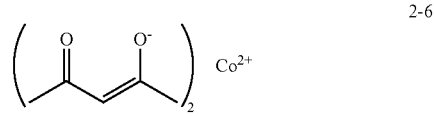 2-6
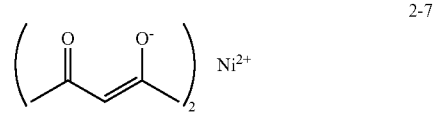 2-7
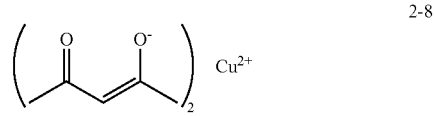 2-8
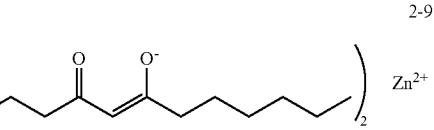 2-9

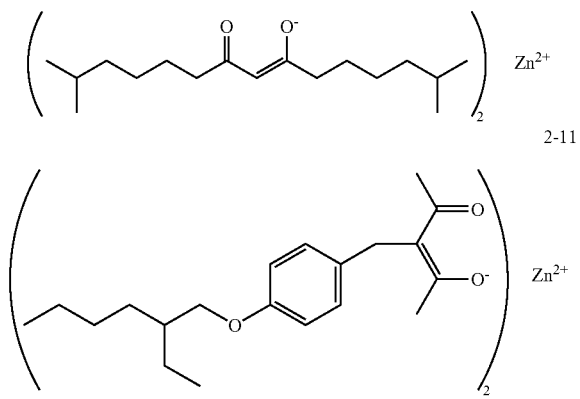

2-10

2-11

The metal salt of aliphatic carboxylic acid and the 1,3-diketone metal compound can be prepared by a complex-forming reaction in solution. Alternatively, any one of other known methods may be used.

The metal compound is contained at least in the first liquid. The content of the metal compound according to the invention is preferably 1 to 90 mass %, more preferably 5 to 75 mass %, and particularly preferably 10 to 50 mass %, with respect to the total amount of the multiple kinds of liquid. A lower content may impair the advantageous effects of the invention, while a higher content may cause a problem in ejection of ink liquid because of high viscosity.

Liquids other than the first liquid (such as second liquid) may or may not contain a metal compound, but preferably contain substantially no metal compound in the invention. Specifically, the content of the metal compound, in particular the content of the metal compound in the colorant-containing liquid, is preferably 0 to 10 mass % and more preferably 0 to 5 mass %.

[Colorant]

In the invention, among the multiple kinds of liquid including the first and second liquids, each liquid may contain no colorant (colorless ink), or at least any one liquid may contain a colorant.

The content of the colorant in the first liquid containing a metal compound is preferably 1 mass % or less, more preferably 0.5 mass % or less, and still more preferably 0.1 mass % or less; and particularly preferably, the first liquid contains substantially no colorant, as described above. The phrase "containing substantially no colorant" does not exclude presence of a transparent and colorless dye or pigment, or a substantially invisible trace amount of colorant.

On the other hand, the second liquid may or may not contain a colorant, but preferably contains a colorant. When the second liquid contains a colorant and the first liquid contains a metal compound, the colorant and the metal compound are contained in separate liquids, which is effective in particular in prevention of color separation, one of the advantageous effects of the invention.

Alternatively, the colorant may be contained in liquids other than the first and second liquids. However, as described above, no metal compound is preferably contained in the liquid containing a colorant.

The colorant for use in the invention is not particularly limited, as long as it has a hue and a color density suitable for the purpose of use of the ink, and any known water-soluble dyes, oil soluble dyes, and pigments properly selected may be used. As described above, each of the liquids including the first and second liquids for the inkjet-recording ink set according to the invention is preferably a water-insoluble liquid; if the liquid contains a solvent, it preferably contains no aqueous solvent from the viewpoints of ink ejection stability and drying speed; use of an oil-soluble dye or pigment, which is more easily dispersible or soluble in the water-insoluble liquid, is preferable from the same viewpoints; and use of a pigment is more preferable for obtaining the advantageous effects of the invention, i.e., improvement in image quality and weather resistance.

(Oil-Soluble Dye)

The oil-soluble dye usable in the invention is not particularly limited, and may be an arbitrarily selected oil-soluble dye. Examples of oil-soluble dyes usable in the invention are described below for respective hues.

Examples of yellow dyes include: aryl azo dyes having coupling components selected from phenols, naphthols, anilines, pyrazolones, pyridones, and open-chain active methylene compounds; heteryl azo dyes having coupling components selected from phenols, naphthols, anilines, pyrazolones, pyridones, and open-chain active methylene compounds; azo methine dyes having open-chain active methylene compounds as coupling components; methine dyes such as benzylidene dyes and monomethine oxonol dyes; quinone dyes such as naphthoquinone dyes and anthraquinone dyes; quinophthalone dyes; nitro dyes; nitroso dyes; acridine dyes; and acridinone dyes.

Examples of magenta dyes include: aryl azo dyes having coupling components selected from phenols, naphthols, and anilines; heteryl azo dyes having coupling components selected from phenols, naphthols, and anilines; azo methine dyes having coupling components selected from pyrazolones and pyrazolotriazoles; methine dyes such as arylidene dyes, styryl dyes, melocyanine dyes, and oxonol dyes; carbonium dyes such as diphenylmethane dyes, triphenylmethane dyes, and xanthene dyes; quinone dyes such as naphthoquinone, anthraquinone, and anthrapyridone; and condensed-ring polycyclic dyes such as dioxazine dyes.

Examples of cyan dyes include: indoaniline dyes; indophenol dyes; azo methine dyes having pyrrolotriazoles as coupling components; polymethine dyes such as cyanine dyes, oxonol dyes, and melocyanine dyes; carbonium dyes such as diphenylmethane dyes, triphenylmethane dyes, and xanthene dyes; phthalocyanine dyes; anthraquinone dyes; arylazo dyes having coupling components selected from phenols, naphthols, and anilines; heterylazo dyes having coupling components selected from phenols, naphthols, and anilines; indigo dyes; and thioindigo dyes.

Each of the above dyes may be a dye which shows yellow, magenta, or cyan only after dissociation of a part of the coloring atomic group (chromophore); in this case, the counter-cation may be an inorganic cation such as an alkali metal or ammonium, or an organic cation such as pyridinium or a quaternary ammonium salt, or a polymer cation having such an inorganic or organic cation as a partial structure.

The content of an oil-soluble dye in the second liquid, when the oil-soluble dye is used as a colorant, is preferably in the range of 0.05 to 20 mass %, more preferably 0.1 to 15 mass %, and still more preferably, 0.2 to 6 mass %, as solid matter. Alternatively, the content of the oil-soluble dye in the liquid other than the first and second liquids is preferably in the range of 0 to 1 mass % as solid matter in the liquid.

(Pigment)

Use of a pigment as the colorant is also favorable, because it causes aggregation more easily when multiple kinds of liquid are mixed.

Both organic and inorganic pigments may be used as the pigments for use in the invention, but the black pigment is preferably, for example, a carbon black pigment or the like. Pigments in black and three primary colors, cyan, magenta, and yellow, are commonly used, but a pigment in other color, for example, red, green, blue, brown, white or the like, a metalescent pigment, for example, in gold or silver in color, a colorless or pale-colored extender pigment, or the like may be used according to applications.

Alternatively, particles comprising a core material of silica, alumina, or resin particle and a dye or pigment bound to the surface thereof, insoluble dye lakes, colored emulsions, colored latexes, and the like may also be used as the pigments.

Yet alternatively, resin-coated pigments may also be used. These so-called microcapsulated pigments are commercially available, for example, from Dainippon Ink and Chemicals, Inc. and Toyo Ink Mfg. Co., Ltd.

The volume-average particle diameter of the pigment particles contained in the liquid in the invention is preferably 30 to 250 nm, more preferably 50 to 200 nm, from the viewpoint of the balance of the optical density and the storage stability. The volume-average particle diameter of the pigment particles can be measured by a measuring instrument such as LB-500 manufactured by Horiba Ltd.

The content of a pigment in the second liquid when the pigment is used as a colorant is preferably in the range of 0.1 to 20 mass %, more preferably 1 to 10 mass %, as solid matter, from the viewpoints of optical density and ejection stability. Alternatively, the content of the pigment, when contained in a liquid other than the first and second liquids, is preferably in the range of 0 to 1 mass % as solid matter in the liquid.

The colorants may be used alone or in combination of two or more. The colorants in different liquids may be the same as or different from each other.

[Polymerizable Compound]

In the invention, at least one liquid among the multiple kinds of liquid including the first and second liquids contains a polymerizable compound. The polymerizable compound is favorably contained in the second liquid, but, in another favorable embodiment, the polymerizable compound is contained in both the first and second liquids, because the liquids become more compatible with each other. The colorant is contained in the second liquid in a favorable embodiment, and in this case, the colorant contained in the second liquid is thought to be trapped more efficiently because these liquids become more compatible with each other.

The polymerizable compound has a function to react and cure in the polymerization reaction initiated by the radicals generated from the polymerization initiator described below. When such a polymerizable compound is contained in any one of the liquids, it is possible to carry out polymerization and solidification by energy such as light or heat and thus fix an image formed.

Any known polymerizable compounds that polymerize in a radical or cationic polymerization reaction, a dimerization reaction, or the like may be used as the polymerizable compound. Examples thereof include addition-polymerizable compounds having at least one ethylenically unsaturated double bond, oxetane compounds, oxirane compounds, polymeric compounds having a maleimide group on the side chain, polymeric compounds having a cinnamyl, cinnamylidene or chalcone group or the like having a photodimerizable unsaturated double bond close to an aromatic ring on the side chain, and the like; addition-polymerizable compounds having at least one ethylenically unsaturated double bond are more preferable; and compounds selected from those having at least one terminal ethylenically unsaturated bond, more preferably two or more terminal ethylenically unsaturated bonds (monofunctional or multifunctional compounds) are particularly preferable. Specifically, the polymerizable compound is selected from compounds widely known in the art, and such compounds include those in various chemical forms, for example, monomers, prepolymers such as dimer, trimer and oligomer, or the mixtures thereof, and the copolymers thereof.

The polymerizable compound preferably has a polymerizable group such as an acryloyl group, a methacryloyl group, an allyl group, a vinyl group, or an internal double bond group such as maleic acid. The polymerizable group is more preferably an acryloyl group or a methacryloyl group since a compound having an acryloyl group or a methacryloyl group can be cured with low energy.

The polyfunctional polymerizable compound usable in the invention may be selected from: vinyl-group-containing aromatic compounds; (meth)acrylic esters formed by combinations of (meth)acylic acid and alcohols having at least two hydroxyl groups; (meth)acrylamides formed by combinations of (meth)acrylic acid and amines having di- or higher-valency; esters formed by combinations of polybasic acids and dihydric alcohols; polyester(meth)acrylates formed by introduction of (meth)acylic acid to polycaprolactones; polyether(meth)acrylates formed by introduction of (meth)acrylic acid to ethers obtained by combining alkyleneoxides with polyhydric alcohols; epoxy(meth)acrylates obtained by introduction of (meth)acrylic acid to epoxy resins or by reaction of di- or higher-hydric alcohols with epoxy-containing monomers; urethane acrylates having urethane bonds; amino resin acrylates; acrylic resin acrylates; alkyd resin acrylates; spiran resin acrylates; silicone resin acrylates; products of reaction of unsaturated polyesters with the above-described photopolymerizable monomers; and products of reaction of waxes with the above-described polymerizable monomers. In a preferable embodiment, the polyfunctional polymerizable compound is selected from: (meth)acrylates; polyester (meth)acrylates; polyether (meth)acrylates; epoxy acrylates; urethane acrylates; acrylic resin acrylates; silicone resin acrylates; and products of reaction of unsaturated polyesters with the above-described photopolymerizable monomers. In a more preferable embodiment, the polyfunctional polymerizable compound is selected from: acrylates; polyester acrylates; polyether acrylates; epoxy acrylates; and urethane acrylates.

In this specification, the term "(meth)acrylic acid" refers to acrylic acid or methacrylic acid or both.

Specific examples of the polyfunctional polymerizable compound include: divinylbenzene; 1,3-butanediol diacrylate; 1,6-hexanediol diacrylate; pentaerythritol triacrylate; trimethylolpropane triacrylate; dipentaerythritol hexaacrylate; 1,6-acryloylaminohexane; hydroxypivalic acid ester neopentylglycol diacrylate; polyester acrylates in which (meth)acryloyl groups are attached to terminals of molecular chains of polyesters formed by a dibasic acid and a dihydric alcohol, the polyesters having a molecular weight in the range of 500 to 30000; polyethyleneglycol diacrylates; epoxy acrylates having skeletons selected from bisphenol A, bisphenol S, and bisphenol F and having molecular weights in the range of 450 to 30000; epoxy acrylates having phenol-novolac resin skeletons and having molecular weights in the range of 600 to 30000; products of reaction of (meth)acrylic acid monomers having hydroxyl groups with polyvalent isocyanates having molecular weights in the range of 350 to 30000; and modified products of urethanes having urethane bonds in the molecule.

The monofunctional polymerizable monomer usable in the invention may be a (meth)acrylate, styrene, acrylamide, a vinyl-group-containing monomer (such as a vinyl ester, a vinyl ether, or an N-vinylamide), or (meth)acrylic acid, preferably a (meth)acrylate, acrylamide, a vinyl ester, or a vinyl ether, more preferably a (meth)acrylate or acrylamide. Such polymerizable monomers may have a substituent. The substituent may be a halogen atom, a hydroxyl group, an amide group, or a carboxylic acid group.

Specific examples of the monofunctional polymerizable monomer include: hydroxyethyl acrylate; glycidyl acrylate; tetrahydrofurfuryl acrylate; dicyclopentenyl acrylate; 2-acryloyloxyethyl phosphate; allyl acrylate; N,N-dimethylaminoethyl acrylate; N,N-dimethylacrylamide; N,N-diethylaminopropylacrylamide; N-butoxymethylacrylamide; acryloyl morpholine; 2-hydroxyethylvinyl ether; N-vinylformamide; N-vinylacetamide; 2-cyclohexylcarbamoyloxyethyl acrylate; acrylates each having a polybutyl acrylate moiety in the ester portion; and acrylates each having a polydimethylsiloxane moiety in the ester portion.

The polymerizable compounds may be used alone or in combination of two or more. If the polymerizable compounds are contained in multiple kinds of liquid, different kinds of polymerizable compounds or the same kind of polymerizable compounds may be used in respective liquids, but the same kind of polymerizable compounds are preferably used, because the multiple kinds of liquid become more compatible with each other.

The content of the polymerizable compound, when contained in one or more of the multiple kinds of liquid, is preferably in the range of 50 to 99.6 mass %, more preferably 70 to 99.0 mass %, and still more preferably 80 to 99.0 mass %, as solid matter in one liquid. The content is preferably in the range of 20 to 98 mass %, more preferably 40 to 95 mass %, and still more preferably 50 to 90 mass %, as solid matter in the total liquids.

When a polymerizable compound is contained in both the first and second liquids, the content of the polymerizable compound in the first liquid is preferably 1 to 1,000 wt parts, more preferably 5 to 100 wt parts, and still more preferably 10 to 50 wt parts, with respect to 100 wt parts of the content of the polymerizable compound in the second liquid.

[Polymerization Initiator]

As described above, in the invention, at least one of the multiple kinds of liquid (including the first and second liquids) used preferably contains a polymerization initiator that starts curing of the polymerizable compound. The polymerization initiator is preferably contained in a liquid containing no polymerizable compound from the viewpoint of the storage stability of the liquid, and the initiator and the polymerizable compound cause a polymerization-curing reaction as they are activated by the energy added onto the recording medium.

As described above, when the polymerizable compound is contained in both the first and second liquids, the polymerization initiator may be contained in the third liquid containing no polymerizable compound from the viewpoint of liquid storage stability. The content of the polymerization initiator in the third liquid is preferably 0.5 to 20 mass %, more preferably 1 to 15 mass %, and still more preferably, 3 to 10 mass %, from the viewpoint of storability. On the other hand, when the inkjet-recording ink set consists only of two liquids, first and second liquids, the polymerizable compound is contained in both the liquids; but the polymerization initiator is preferably contained in the second liquid containing a colorant from the viewpoint of storability. The colorant is thought to function as a filter and suppress curing over time.

The polymerization initiator for use in the invention is a compound that generates polymerization-initiating species such as radical by the energy of light, heat, or both, and initiates and accelerates polymerization of the polymerizable compound. A compound suitably selected from known thermal polymerization initiators, compounds having a smaller bond dissociation energy, photopolymerization initiators, or the like is used as the polymerization initiator according to the invention.

Examples of the radical generators include organic halogenated compounds, carbonyl compounds, organic peroxide compounds, azo polymerization initiators, azide compounds, metallocene compounds, hexaarylbiimidazole compounds, organic boric acid compounds, disulfonic acid compounds, onium salt compounds, and the like.

Preferable examples of the polymerization initiator in the invention include the following photopolymerization initiators: acetophenone derivatives, benzophenone derivatives, benzyl derivatives, benzoin derivatives, benzoin ether derivatives, benzyldialkylketal derivatives, thioxanthone derivatives, acylphosphine oxide derivatives, metal complexes, p-dialkylaminobenzoic acid, azo compounds, and peroxide compounds. As the polymerization initiator, preferable are acetophenone derivatives, benzyl derivatives, benzoin ether derivatives, benzyldialkylketal derivatives, thioxanthone derivatives, and acylphosphine oxide derivatives. Still more preferable are acetophenone derivatives, benzoin ether derivatives, benzyldialkylketal derivatives and acylphosphine oxide derivatives.

Specific examples of the photopolymerization initiator include acetophenone, 2,2-diethoxyacetophenone, p-dimethylaminoacetophenone, p-dimethylaminopropiophenone, benzophenone, p,p'-dichlorobenzophenone, p,p'-bisdiethylaminobenzophenone, Michler's ketones, benzyl, benzoin, benzoin methyl ether, benzoin isopropyl ether, benzoin-n-propyl ether, benzoin isobutyl ether, benzyl dimethyl ketal, 1-hydroxy-cyclohexyl phenyl ketone, tetramethylthiram monosulfide, thioxanthone, 2-chlorothioxanthone, 2,4-dimethylthioxanthone, 2,2-dimethylpropionyl diphenylphosphine oxide, 2-methyl-2-ethylhexanoyl diphenylphosphine oxide, 2,6-dimethylbenzoyl diphenylphosphine oxide, 2,6-dimethoxybenzoyl diphenylphosphine oxide, 2,4,6-trimethylbenzoyl diphenylphosphine oxide, bis(2,6-dimethoxybenzoyl)-2,4,4-trimethylpentylphosphine oxide, 2,3,6-trimethylbenzoyl-diphenylphosphine oxide, bis(2,3,6-trimethylbenzoyl)-phenylphosphine oxide, 2,4,6-trimethoxybenzoyl-diphenylphosphine oxide, 2,4,6-trichlorobenzoyl diphenylphosphine oxide, 2,4,6-trimethylbenzoyl naphtylphosphonate, bis($\eta$5-2,4-cyclopentadiene-1-yl)-bis(2,6-difluoro-3-(1H-pyrrole-1-yl)-phenyl)titanium, p-dimethylaminobenzoic acid, p-diethylaminobenzoic acid, azobisisobutyronitrile, 1,1'-azobis(1-acetoxy-1-phenylethane), benzoin peroxide, and di-tert-butyl peroxide.

Other preferable examples of the photopolymerization initiator include the photopolymerization initiators disclosed in Seishi Kato "Shigaisen Kouka System" (UV curing system) published by Sougou Gijutsu Center Co., Ltd (currently Extensive Technology Service Co., Ltd) (1989), pp. 65-148, the disclosure of which is incorporated herein by reference.

The sensitivity of the polymerization initiator is preferably high. From the viewpoint of storage stability, it is not preferable to use a polymerization initiator which thermally decomposes, for example at 80° C. or lower. Accordingly, it is preferable to select a polymerization initiator which does not thermally decompose at 80° C. or lower.

Only a single polymerization initiator may be used, or two or more polymerization initiators may be used in combination. The polymerization initiator may be used together with a known sensitizer for the purpose of improving the sensitivity, as long as the effects of the invention can be achieved.

[Ink Set]

The ink set of the invention is not limited as long as the first liquid contains a metal compound (a) dissolved therein and at least one of the multiple kinds of liquid contains a polymerizable compound (c); but it is preferable that the ink set comprises multiple kinds of liquid including at least a first liquid containing substantially no colorant (b) but containing a metal compound (a) and a second liquid containing substantially no metal compound (a) but containing a colorant (b), wherein at least one of the multiple kinds of liquid contains a polymerizable compound (c).

In the case of a two-liquid system using the first and second liquids, favorable combinations of the first and second liquids include:

(1) a combination of the first liquid containing a metal compound (a) and a polymerizable compound (c) and the second liquid containing a colorant (b), (2) a combination of the first liquid containing a metal compound (a) and the second liquid containing a colorant (b) and a polymerizable compound (c), and (3) a combination of the first liquid containing a metal compound (a) and a polymerizable compound (c) and the second liquid containing a colorant (b) and a polymerizable compound (c).

In each of the combinations (1) to (3), the first liquid and/or the second liquid preferably contain a polymerization initiator additionally, but in such a case, the polymerization initiator is preferably contained in a liquid containing no polymerizable compound (c) in the combination (1) or (2), from the viewpoint of storage stability.

When three or more liquids are used, the first liquid and/or the second liquid may contain a polymerization initiator, or alternatively, the first liquid and/or the second liquid may contain no polymerization initiator but the third liquid may contain it. Yet alternatively, the first liquid and/or the second liquid as well as the third liquid may contain a polymerization initiator.

<Other Component>

In addition to the components described above, the multiple kinds of liquid according to the invention may contain the following additives according to applications.

(Solvent)

In the invention, a solvent may be added to one or more of the multiple kinds of liquid, for improvement in ink polarity, viscosity, surface tension, solubility/dispersibility of colorants, and control of conductivity and printing performance. The solvent is preferably a water-insoluble liquid, and preferably contains substantially no aqueous solvent from the viewpoints of ink ejection stability and drying speed.

The following high-boiling-point organic solvent is preferably used in at least one metal-compound-containing liquid such as the first liquid. The high-boiling-point organic solvent may also be used in liquids containing no metal compound.

Low-boiling-point organic solvents having a boiling point of 100° C. or lower, which can be used as the solvent but may affect the curing efficiency, are preferably not used from the viewpoint of environmental pollution. If used, a safer solvent is preferable, and the safer solvent is a solvent having a higher standard control concentration (an indicator used in evaluation of working environment), and solvents having a control concentration of 100 ppm or more are preferable, and those having a control concentration of 200 ppm or more are still more preferable. Examples thereof include alcohols, ketones, esters, ethers, hydrocarbons, and the like; and specific examples thereof include methanol, 2-butanol, acetone, methylethylketone, ethyl acetate, tetrahydrofuran, and the like.

The solvents may be used alone or in combination of two or more; when water and/or the low-boiling-point organic solvent are used, the amount of each of them is preferably 0 to 20 mass %, more preferably 0 to 10 mass %, and particularly preferably, substantially zero in each liquid. Presence of water in the liquid is undesirable, from the viewpoint of stability over time, i.e., increase in turbidity due to disproportionation of the liquid over time, precipitation of dye, and others, and from the viewpoint of the drying efficiency when a non-water-adsorptive recording medium is used. The amount of "substantially zero" means that presence of unavoidable impurities is allowed.

-High-Boiling-Point Organic Solvent-

In the invention, any one or more of the multiple kinds of liquid may contain a high-boiling-point organic solvent. The high-boiling-point organic solvent according to the invention is (1) an organic solvent having a boiling point of 100° C. or higher.

The boiling point in the (1) is more preferably 150° C. or higher and particularly preferably 170° C. or higher. In addition, the high-boiling-point organic solvent preferably has a melting point of 80° C. or lower and more preferably 25° C. or lower.

Presence of the high-boiling-point organic solvent prevents bleeding and interference between ejected droplets more effectively.

A high-boiling-point organic solvent not satisfying the boiling-point condition of the (1) vaporizes during image formation because of its low boiling point, and may impair the advantageous effect of the invention in preventing interference between ejected droplets. Moreover, a measure to prevent gas generated by the vaporization of the solvent from diffusing in the air is necessary to preserve environment.

The high-boiling-point organic solvent is preferably contained in a metal compound-containing liquid and more preferably in a liquid containing no polymerizable compound, from the viewpoint of more effective suppression of the bleeding and interference between ejected droplets.

The high-boiling-point organic solvent is favorably (2) a solvent having a viscosity at 25° C. of 100 mPa·s or less or a viscosity at 60° C. of 30 mPa·s or less. A high-boiling-point organic solvent not satisfying the viscosity condition of the (2) may be unsuitable for application of the liquid onto a recording medium because of its high viscosity.

The viscosity at 25° C. in the (2) is more preferably 70 mPa·s or less, still more preferably 40 mPa·s or less, and particularly preferably 20 mPa·s or less. The viscosity at 60° C. is more preferably 20 mPa·s or less and particularly preferably 10 mPa·s or less. The solubility of water in the high-boiling-point organic solvent (25° C.) is preferably 4 g or less. The solubility of water is more preferably 3 g or less, still more preferably 2 g or less, and particularly preferably 1 g or less.

The "viscosity" in the invention is that determined by the following method.

The viscosity is a value determined by using RE80 Viscometer manufactured by Toki Sangyo Co., Ltd. The RE80 viscometer is a conical rotor/flat plate viscometer corresponding to E-type viscometer, and the rotor used in measurement has normally rotor code No. 1 and the rotational frequency is 10 rpm. However, for measurement of a liquid having a viscosity of higher than 60 m Pa·s, the rotational frequency is changed to 5, 2.5, 1, or 0.5 as needed.

The "solubility of water" in the invention is the saturated concentration of water in the high-boiling point organic solvent at 25° C., i.e., the mass (g) of water soluble in 100 g of the high-boiling point organic solvent at 25° C.

The amount of the high-boiling-point organic solvent added to the liquid is preferably in the range of 50 to 100 mass %, more preferably 70 to 100 mass %, and particularly preferably 90 to 100 mass %, with respect to the total mass of the liquid.

The amount of the high-boiling point organic solvent used in the ink set of the invention is preferably 5 to 2,000 mass %, more preferably, 10 to 1,000 mass %, as the amount coated, with respect to the colorant used.

Examples of the high-boiling point organic solvents favorable in the invention include the compounds represented by the following Formulae [S-1] to [S-9].

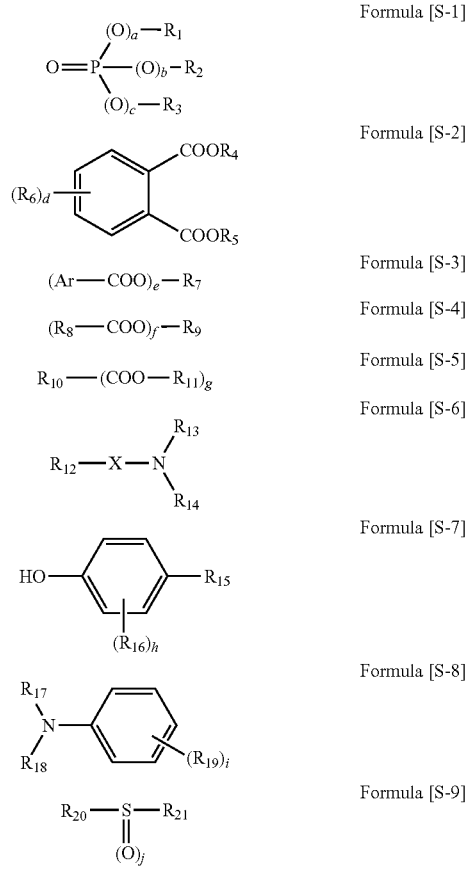

In Formula [S-1] above, $R_1$, $R_2$ and $R_3$ each independently represent an aliphatic or aryl group; and each of a, b, and c is independently 0 or 1.

In Formula [S-2], $R_4$ and $R_5$ each independently represent an aliphatic or aryl group;

$R_6$ represents a halogen atom (F, Cl, Br, or I, hereinafter, the same shall apply), or an alkyl, alkoxy, aryloxy, alkoxycarbonyl or aryloxycarbonyl group; and d is an integer of 0 to 3. When d is 2 or more, the multiple $R_6$ groups may be the same as or different from each other.

In Formula [S-3], Ar represents an aryl group; e is an integer of 1 to 6; and $R_7$ represents an e-valent hydrocarbon group or an e-valent group wherein hydrocarbon groups are linked to each other via ether bonds.

In Formula [S-4], $R_8$ represents an aliphatic group; f is an integer of 1 to 6; and $R_9$ represents an f-valent hydrocarbon group or an f-valent group wherein hydrocarbon groups are linked to each other via ether bonds.

In Formula [S-5], g is an integer of 2 to 6; $R_{10}$ represents a g-valent hydrocarbon group (excluding an aryl group); and $R_1$ represents an aliphatic or aryl group.

In Formula [S-6], $R_{12}$, $R_{13}$ and $R_{14}$ each independently represent a hydrogen atom, or an aliphatic or aryl group; X represents —CO— or —SO$_2$—; and $R_{12}$ and $R_{13}$, or $R_{13}$ and $R_{14}$ may bind to each other, forming a ring.

In Formula [S-7], $R_{15}$ represents an aliphatic, alkoxycarbonyl, aryloxycarbonyl, alkylsulfonyl, arylsulfonyl, aryl or cyano group; $R_{16}$ represents a halogen atom or an aliphatic, aryl, alkoxy or aryloxy group; and h is an integer of 0 to 3. When h is 2 or more, the multiple $R_{16}$ groups may be the same as or different from each other.

In Formula [S-8], $R_{17}$ and $R_{18}$ each independently represent an aliphatic or aryl group; $R_{19}$ represents a halogen atom or an aliphatic, aryl, alkoxy or aryloxy group; and i is an integer of 0 to 5. When i is 2 or more, the multiple $R_{19}$ groups may be the same as or different from each other.

In Formula [S-9], $R_{20}$ and $R_{21}$ each independently represent an aliphatic or aryl group; j is 1 or 2; and $R_{20}$ and $R_{21}$ may bind to each other, forming a ring.

In Formulae [S-1] to [S-9], when any of $R_1$ to $R_6$, $R_8$, and $R_{11}$ to $R_{21}$ is an aliphatic group or a group containing an aliphatic group, the aliphatic group may be a straight-chain, branched-chain, or cyclic group, and may contain an unsaturated bond or an additional substituent group. Examples of the substituent groups include halogen atoms, aryl, alkoxy, aryloxy, alkoxycarbonyl, hydroxyl, acyloxy, and epoxy groups, and the like.

In Formulae [S-1] to [S-9], when any of $R_1$ to $R_6$, $R_8$, and $R_1$ to $R_{21}$ is a cyclic aliphatic group, i.e., a cycloalkyl group or a group containing a cycloalkyl group, the cycloalkyl group may contain an unsaturated bond in its three- to eight-membered ring, and may have an additional substituent group or a crosslinking group. Examples of the substituent groups include halogen atoms and aliphatic, hydroxyl, acyl, aryl, alkoxy, and epoxy groups, and the like; and examples of the crosslinking groups include methylene, ethylene, isopropylidene, and the like.

When any of $R_1$ to $R_6$, $R_{11}$ to $R_{21}$, and Ar in Formulae [S-1] to [S-9] is an aryl group or a group containing an aryl group, the aryl group may be substituted with a substituent group such as a halogen atom, an aliphatic, aryl, alkoxy, aryloxy, alkoxycarbonyl group, or the like.

When any of $R_7$, $R_9$ and $R_{10}$ in Formulae [S-3], [S-4], and [S-5] is a hydrocarbon group, the hydrocarbon group may have a cyclic structure (e.g., benzene ring, cyclopentane ring, or cyclohexane ring) or an unsaturated bond, and may also be substituted. Examples of the substituent groups include halogen atoms, hydroxyl, acyloxy, aryl, alkoxy, aryloxy, and epoxy groups.

Hereinafter, particularly favorable high-boiling point organic solvents among the high-boiling point organic solvents represented by Formulae [S-1] to [S-9] will be described.

Preferably, in Formula [S-1], $R_1$, $R_2$ and $R_3$ each independently represent an aliphatic group having 1 to 24 carbon atoms (preferably 4 to 18)(e.g., n-butyl, n-hexyl, n-octyl, EH-octyl, 2-ethylhexyl, 3,3,5-trimethylhexyl, 3,5,5-trimethylhexyl, n-dodecyl, n-octadecyl, benzyl, oleyl, 2-chloroethyl, 2,3-dichloropropyl, 2-butoxyethyl, 2-phenoxyethyl, cyclopentyl, cyclohexyl, 4-t-butylcyclohexyl, or 4-methylcyclohexyl), or an aryl group having 6 to 24 carbon atoms (preferably 6 to 18) (e.g., phenyl, cresyl, p-nonylphenyl, xylyl, cumenyl, p-methoxyphenyl, or p-methoxycarbonylphenyl). Among them, each of $R_1$, $R_2$ and $R_3$ is preferably n-hexyl, n-octyl, EH-octyl, 2-ethylhexyl, 3,5,5-trimethylhexyl, n-dodecyl, 2-chloroethyl, 2-butoxyethyl, cyclohexyl, phenyl, cresyl, p-nonylphenyl, or cumenyl. Each of a, b, and c is independently 0 or 1, and more preferably, all of a, b, and c are 1.

Preferably, in Formula [S-2], $R_4$ and $R_5$ each independently represent an aliphatic group having 1 to 24 carbon atoms (preferably 4 to 18) (e.g., an aliphatic group exemplified above as $R_1$, heptyl, ethoxycarbonylmethyl, 1,1-diethylpropyl, 2-ethyl-1-methylhexyl, cyclohexylmethyl, 1-ethyl-1,5-dimethylhexyl, 3,5,5-trimethylcyclohexyl, menthyl, bornyl, or 1-methylcyclohexyl), or an aryl group having 6 to 24 carbon atoms (preferably 6 to 18) (e.g., an aryl group exemplified above as $R_1$, 4-t-butylphenyl, 4-t-octylphenyl, 1,3,5-trimethylphenyl, 2,4-di-t-butylphenyl, or 2,4-di-t-pentylphenyl). Among them, each of $R_4$ and $R_5$ is more preferably an aliphatic group, in particular an n-butyl, heptyl, 2-ethylhexyl, n-dodecyl, 2-butoxyethyl, or ethoxycarbonylmethyl group.

$R_6$ is preferably an halogen atom (preferably chlorine atom), an alkyl group having 1 to 18 carbon atoms (e.g., methyl, isopropyl, t-butyl, or n-dodecyl), an alkoxy group having 1 to 18 carbon atoms (e.g., methoxy, n-butoxy, n-octyloxy, methoxyethoxy, or benzyloxy), an aryloxy group having 6 to 18 carbon atoms (e.g., phenoxy, p-tolyloxy, 4-methoxyphenoxy, or 4-t-butylphenoxy), an alkoxycarbonyl group having 2 to 19 carbon atoms (e.g., methoxycarbonyl, n-butoxycarbonyl, or 2-ethylhexyloxycarbonyl), or an aryloxycarbonyl group having 6 to 25 carbon atoms. Among them, $R_6$ is more preferably an alkoxycarbonyl group and in particular a n-butoxycarbonyl group. d is 0 or 1.

In Formula [S-3], Ar is preferably an aryl group having 6 to 24 carbon atoms (preferably 6 to 18) (e.g., phenyl, 4-chlorophenyl, 2,4-dichlorophenyl, 4-methoxyphenyl, 1-naphthyl, 4-n-butoxyphenyl, 1,3,5-trimethylphenyl, or 2-(2-n-butoxycarbonylphenyl)phenyl); and among them, Ar is particular preferably a phenyl, 2,4-dichlorophenyl, or 2-(2-n-butoxycarbonylphenyl)phenyl group.

e is an integer of 1 to 4 (preferably 1 to 3).

$R_7$ is preferably a e-valent hydrocarbon group having 2 to 24 carbon atoms (preferably 2 to 18) [e.g., an aliphatic group exemplified above as $R_4$, n-octyl, an aryl group exemplified above as $R_4$, —(CH$_2$)$_2$—, or

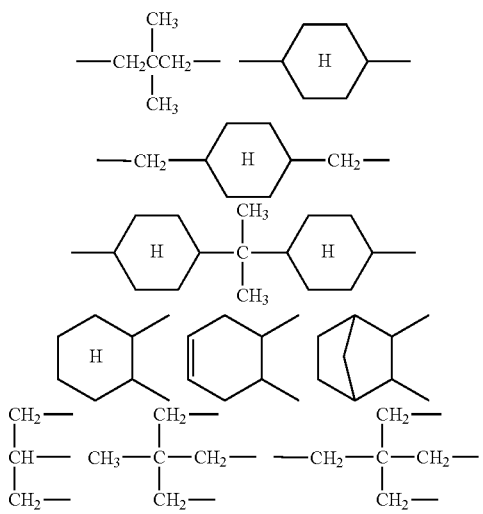

or an e-valent group having 4 to 24 carbon atoms (preferably 4 to 18) wherein hydrocarbon groups are linked to each other via ether bonds [e.g., —CH$_2$CH$_2$OCH$_2$CH$_2$—, —CH$_2$CH$_2$(OCH$_2$CH$_2$)$_3$—, —CH$_2$CH$_2$CH$_2$OCH$_2$CH$_2$CH$_2$—, or

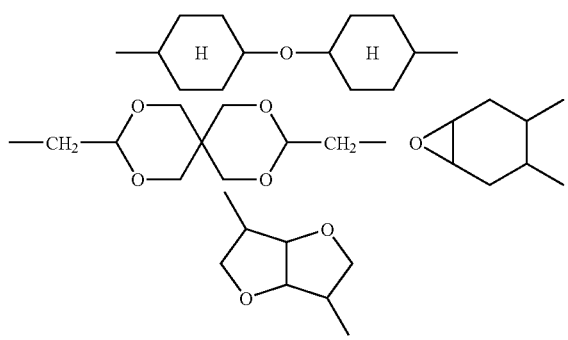

Among them, $R_7$ is more preferably an alkyl group and in particular a n-butyl, n-octyl, or 2-ethylhexyl group.

In Formula [S-4], $R_8$ is preferably an aliphatic group having 1 to 24 carbon atoms (preferably 1 to 17) (e.g., methyl, n-propyl, 1-hydroxyethyl, 1-ethylpentyl, n-heptyl, n-undecyl, n-tridecyl, pentadecyl, 8,9-epoxy heptadecyl, cyclopropyl, cyclohexyl, or 4-methylcyclohexyl); and among them, $R_8$ is particularly preferably an n-heptyl, n-tridecyl, 1-hydroxyethyl, 1-ethylpentyl, or 8,9-epoxyheptadecyl group.

f is an integer of 1 to 4 (preferably 1 to 3).

$R_9$ is preferably an f-valent hydrocarbon group having 2 to 24 carbon atoms (preferably 2 to 18) or an f-valent group having 4 to 24 carbon atoms (preferably 4 to 18) wherein hydrocarbon groups are linked to each other via ether bonds (e.g., a group exemplified above as $R_7$, 1-methyl-2-methoxyethyl, or 2-hexyldecyl); and among them, $R_9$ is particularly preferably a 2-ethylhexyl, 2-hexyldecyl, 1-methyl-2-methoxyethyl group, or

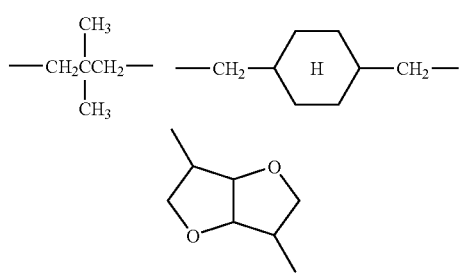

In Formula [S-5], g is 2 to 4 (preferably 2 or 3).

$R_{10}$ is preferably a g-valent hydrocarbon group e.g., $CH_2$—, —$(CH_2)_2$—, —$(CH_2)_4$—, —$(CH_2)_7$—, —$(CH_2)_8$—, or

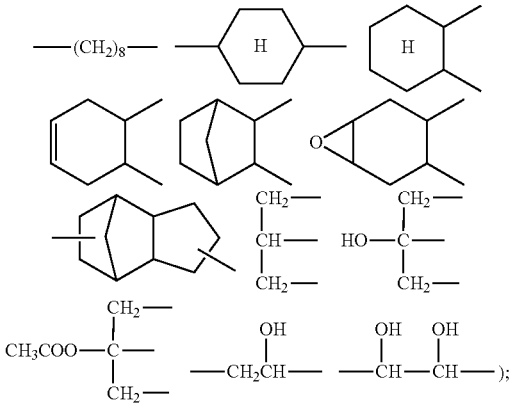

and among them, $R_{10}$ is particularly preferably —$(CH_2)_4$—, —$(CH_2)_8$—, or

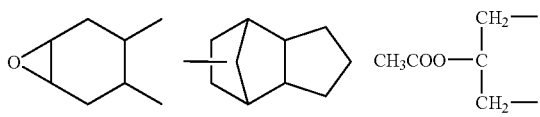

$R_{11}$ is preferably an aliphatic group having 1 to 24 carbon atoms (preferably 4 to 18) or an aryl group having 6 to 24 carbon atoms (preferably 6 to 18) (e.g., an aliphatic or aryl group exemplified above as $R_4$); and among them, $R_{11}$ is more preferably an alkyl group and still more preferably an n-butyl, n-octyl, or 2-ethylhexyl group.

In Formula [S-6], $R_{12}$ is preferably a hydrogen atom, an aliphatic group having 1 to 24 carbon atoms (preferably 3 to 20) (e.g., n-propyl, 1-ethylpentyl, n-undecyl, n-pentadecyl, 2,4-di-t-pentylphenoxymethyl, 4-t-octylphenoxymethyl, 3-(2,4-di-t-butylphenoxy)propyl, 1-(2,4-di-t-butylphenoxy)propyl, cyclohexyl, 4-methylcyclohexyl, 8-N,N-diethylcarbamoyloctyl, or an aryl group having 6 to 24 carbon atoms (preferably 6 to 18) (e.g., an aryl group exemplified above as Ar, 3-methylphenyl, or 2-(N,N-di-n-octylcarbamoyl)phenyl); and among them, $R_{12}$ is particularly preferably an n-undecyl, 8-N,N-diethylcarbamoyloctyl, 3-methylphenyl, or 2-(N,N-di-n-octylcarbamoyl)phenyl group.

Each of $R_{13}$ and $R_{14}$ is preferably a hydrogen atom, an aliphatic group having 1 to 24 carbon atoms (preferably 1 to 18) (e.g., methyl, ethyl, isopropyl, n-butyl, n-hexyl, n-octyl, 2-ethylhexyl, n-dodecyl, n-tetradecyl, cyclopentyl, or cyclopropyl), or an aryl group having 6 to 18 carbon atoms (preferably 6 to 15) (e.g. phenyl, 1-naphthyl, p-tolyl); and among them, each of $R_{13}$ and $R_{14}$ is particularly preferably a methyl, ethyl, n-butyl, n-octyl, n-tetradecyl, or phenyl group.

$R_{13}$ and $R_{14}$ may bind to each other, forming an N-containing ring such as pyrrolidine, piperidine, or morpholine ring, and $R_{12}$ and $R_{13}$ may bind to each other, forming an N-containing ring such as pyrrolidone or piperidine ring.

X is —CO— or —$SO_2$—, and preferably, X is —CO—.

In Formula [S-7], $R_{15}$ is preferably an aliphatic group having 1 to 24 carbon atoms (preferably 3 to 18) (e.g., methyl, isopropyl, t-butyl, t-pentyl, t-hexyl, t-octyl, 2-butyl, 2-hexyl, 2-octyl, 2-dodecyl, 2-hexadecyl, t-pentadecyl, cyclopentyl, or cyclohexyl), an alkoxycarbonyl group having 2 to 24 carbon atoms (preferably 5 to 17) (e.g., n-butoxycarbonyl, 2-ethylhexyloxycarbonyl, or n-dodecyloxycarbonyl), an aryloxycarbonyl group having 7 to 24 carbon atoms (preferably 7 to 18) (e.g., phenoxycarbonyl, naphthoxycarbonyl, or cresyloxycarbonyl), an alkylsulfonyl group having 1 to 24 carbon atoms (preferably 1 to 18) (e.g., methylsulfonyl, n-butylsulfonyl, or n-dodecylsulfonyl), an arylsulfonyl group having 6 to 30 carbon atoms (preferably 6 to 24) (e.g., p-tolylsulfonyl, p-dodecylphenylsulfonyl, or p-hexadecyloxyphenylsulfonyl), an aryl group having 6 to 32 carbon atoms (preferably 6 to 24) (e.g., phenyl, p-tolyl) or a cyano group; and among them, $R_{15}$ is more preferably an aliphatic group having 1 to 24 carbon atoms or an alkoxycarbonyl group having 1 to 24 carbon atoms and particularly preferably an aliphatic group having 1 to 24 carbon atoms.

$R_{16}$ is preferably a halogen atom (preferably Cl), an aliphatic group having 1 to 24 carbon atoms (preferably 1 to 18) [more preferably, an alkyl group (e.g., an alkyl group exemplified above as $R_{15}$) or a cycloalkyl group having 3 to 18 carbon atoms (more preferably 5 to 17) (e.g., cyclopentyl, or cyclohexyl)], an aryl group having 6 to 32 carbon atoms (preferably 6 to 24) (e.g., phenyl, or p-tolyl), an alkoxy group having 1 to 24 carbon atoms (preferably, 1 to 18) (e.g., methoxy, n-butoxy, 2-ethylhexyloxy, benzyloxy, n-dodecyloxy, or n-hexadecyloxy) or an aryloxy group having 6 to 32 carbon atoms (preferably 6 to 24) (e.g., phenoxy, p-t-butylphenoxy, p-t-octylphenoxy, m-pentadecylphenoxy, or p-dodecyloxyphenoxy); and among them, $R_{16}$ is more preferably an aliphatic group having 1 to 24 carbon atoms and particularly preferably an aliphatic group having 1 to 12 carbon atoms.

h is an integer of 1 to 2.

In Formula [S-8], favorable examples of $R_{17}$ and $R_{18}$ are the same as those for $R_{13}$ and $R_{14}$ above excluding a hydrogen atom, and among them, each of $R_{17}$ and $R_{18}$ is more preferably an aliphatic group and particularly preferably an n-butyl, n-octyl, or n-dodecyl group. However, $R_{17}$ and $R_{18}$ do not bind to each other for forming a ring.

Favorable examples of $R_{19}$ are the same as those for $R_{16}$ above, and among them, $R_{19}$ is more preferably an alkyl or alkoxy group and particularly preferably an n-octyl, methoxy, n-butoxy, or n-octyloxy group.

i is an integer of 1 to 5.

In Formula [S-9], favorable examples of $R_{20}$ and $R_{21}$ are the same as those for $R_1$, $R_2$ and $R_3$ above when they do not bind to each other for forming a ring, and among them, each of $R_{20}$ and $R_{21}$ is particularly preferably a substituted or unsubstituted aliphatic group having 1 to 24 carbon atoms.

$R_{20}$ and $R_{21}$ may bind to each other, forming a ring, and the ring formed is preferably a three- to ten-membered ring and particularly preferably a five- to seven-membered ring.

j is 1 or 2, and preferably j is 1.

Hereinafter, specific examples of the high-boiling point organic solvents for use in the invention [S-1 to 53] will be listed with the viscosity (as determined in environments at 25° C. and 60° C. by the method described above) and the boiling point of respective high-boiling point organic solvents. The boiling points of high-boiling point organic solvents in the present specification are values which are obtained by converting the boiling points at reduced pressure (during reduced-pressure distillation) into those at normal pressure. In the following specific examples, solvents with no indicated boiling point are confirmed not to boil at 170° C. Solvents with no indicated viscosity at 25° C. are solid at 25° C.

| | Viscosity (25° C.) | (mPa · s) (60° C.) | Boiling Point (° C.) |
|---|---|---|---|
| Compounds represented by Formula[S-1] | | | |
| S-1  O=P(—O—C₆H₅)₃ | — | 8.3 | 370 |
| S-2  O=P(—O—C₆H₄—CH₃)₃ | 57.6 | 11.8 | 435 |
| S-3  O=P(—O—C₆H₄—C₃H₇(i))₃ | 95 | 17.5 | 485 |
| S-4  O=P(—O—C₆H₅)₂(—O—C₆H₄—CH₃) | 65 | 12.8 | 435 |
| S-5  O=P(OC₁₀H₂₁)(—O—C₆H₄—C₉H₁₉(n))₂ | 49 | 10.3 | 435 |
| S-6  O=P(OCH₂CHC₄H₉(n))₃ with C₂H₅ branch | 11.7 | 4.0 | 390 |
| S-7  O=P(OCH₂CH₂CHCH₂CCH₃)₃ with CH₃ branches | 20.22 | 5.8 | 420 |
| S-8  O=P(OC₁₂H₂₅(n))₃ | 28.6 | 6.9 | 480 |
| S-9  O=P(OC₆H₁₃(n))₃ | 6.62 | 3.0 | 365 |
| S-10  O=P(OCH₂CH₂Cl)₃ | 20.8 | 5.5 | 360 |
| S-11  O=P(OCH₂CH₂OC₄H₉(n))₃ | 10.9 | 3.8 | 400 |
| S-12  ((EH)C₈H₁₇)₃P=O | 41.1 | 9.0 | — |
| S-13  (n)C₈H₁₇—P(=O)(OC₈H₁₇(n))₂ | 13.7 | 4.3 | — |
| Compounds represented by Formula[S-2] | | | |
| S-14  C₆H₄(COOC₄H₉(n))₂ | 20.3 | 5.1 | 370 |
| S-15  C₆H₄(COOC₇H₁₅(branched))₂ | 34.9 | 8.0 | 380 |

-continued

| | | Viscosity (25° C.) | (mPa · s) (60° C.) | Boiling Point (° C.) |
|---|---|---|---|---|
| S-16 | benzene with ortho -COOCH$_2$CH(C$_2$H$_5$)C$_4$H$_9$(n) and -COOCH$_2$CH(C$_2$H$_5$)C$_4$H$_9$(n) | 62.7 | 11.7 | 400 |
| S-17 | benzene with ortho -COOC$_{12}$H$_{25}$(n) and -COOC$_{12}$H$_{25}$(n) | 52.1 | 10.8 | — |
| S-18 | benzene with ortho -COOCH$_2$CH$_2$OC$_4$H$_9$(n) and -COOCH$_2$CH$_2$OC$_4$H$_9$(n) | 42 | 9.1 | 335 |
| S-19 | benzene with ortho -COOC$_2$H$_5$ and -COOCH$_2$COOC$_2$H$_5$ | 74 | 14.2 | 355 |
| S-20 | benzene with -COOC$_4$H$_9$(n), -COOC$_4$H$_9$(n), and (n)C$_4$H$_9$OOC- | 55.7 | 13.1 | 400 |

Compounds represented by Formula[S-3]

| | | | | |
|---|---|---|---|---|
| S-21 | phenyl-COOCH$_2$CH(C$_2$H$_5$)C$_4$H$_9$(n) | 5.68 | 2.4 | 300 |
| S-22 | 2,4-dichlorophenyl-COOC$_8$H$_{17}$(n) | 11.44 | 3.9 | 360 |
| S-23 | biphenyl with -COOC$_9$H$_9$(n) and -COOC$_9$H$_9$(n) | 51.1 | 10.6 | — |

Compounds represented by Formula[S-4]

| | | | | |
|---|---|---|---|---|
| S-24 | (n)C$_{13}$H$_{27}$COOCH(CH$_3$)CH$_2$OCH$_3$ | 7.17 | 3.1 | 380 |
| S-25 | (n)C$_8$H$_{17}$CH(-O-)CH(CH$_2$)$_7$COOCH$_2$CH(C$_2$H$_5$)C$_4$H$_9$(n) | 39.84 | 8.8 | — |
| S-26 | CH$_3$CH(OH)COOCH$_2$CH(C$_8$H$_{17}$(n))C$_6$H$_{13}$(n) | 22.83 | 5.9 | — |

-continued

| | | Viscosity (25° C.) | (mPa·s) (60° C.) | Boiling Point (° C.) |
|---|---|---|---|---|
| S-27 | (n)C$_4$H$_9$CHCOOCH$_2$CCH$_2$OCOCHC$_4$H$_9$(n) with C$_2$H$_5$, CH$_3$, C$_2$H$_5$, CH$_3$ substituents | 12 | 4.0 | — |
| S-28 | (n)C$_4$H$_9$CHCOOCH$_2$—[cyclohexane-H]—CH$_2$OCOCHC$_4$H$_9$(n) with C$_2$H$_5$ groups | 41.4 | 9.0 | 430 |
| S-29 | (n)C$_7$H$_15$COO—[bicyclic difuran]—OCOC$_7$H$_15$(n) | 47.3 | 10.0 | 440 |

Compounds represented by Formula[S-5]

| | | | | |
|---|---|---|---|---|
| S-30 | (n)C$_4$H$_9$CHCH$_2$OCO(CH$_2$)$_4$COOCH$_2$CHC$_4$H$_9$(n) with C$_2$H$_5$ groups | 11.7 | 4.3 | 390 |
| S-31 | (n)C$_4$H$_9$CHCH$_2$OCO(CH$_2$)$_8$COOCH$_2$CHC$_4$H$_9$(n) with C$_2$H$_5$ groups | 19.9 | 6.1 | 410 |
| S-32 | (n)C$_4$H$_9$OCO(CH$_2$)$_8$COOC$_4$H$_9$(n) | 8.09 | 3.5 | 345 |
| S-33 | [epoxycyclohexane-H] with COOC$_8$H$_{17}$(n) groups | 88.9 | 16.5 | — |
| S-34 | (n)C$_4$H$_9$OCO—[tricyclic]—COOC$_4$H$_9$(n) | 37.50 | 8.4 | 440 |
| S-35 | CH$_3$COO—C(CH$_2$COOC$_4$H$_9$(n))(CH$_2$COOC$_4$H$_9$(n))—COOC$_4$H$_9$(n) | 42.7 | 9.3 | 390 |

Compounds represented by Formula[S-6]

| | | | | |
|---|---|---|---|---|
| S-36 | (n)C$_{11}$H$_{23}$CON(C$_4$H$_9$(n))$_2$ | 9.45 | 3.6 | 340 |
| S-37 | hydantoin with C$_8$H$_{17}$(n), H$_3$C and OC$_{16}$H$_{33}$(n) substituents | 45.8 | 9.8 | — |
| S-38 | (n)C$_{14}$H$_{29}$—N-piperidinone | 20.0 | 5.4 | 350 |

-continued

| | | Viscosity (25° C.) | (mPa·s) (60° C.) | Boiling Point (° C.) |
|---|---|---|---|---|
| S-39 | C₆H₅–N(COCH₃)–C₄H₉(n) | 12.83 | 4.2 | 320 |
| S-40 | 1,3-C₆H₄(CON(C₈H₁₇(n))₂)₂ | 77.1 | 14.7 | — |
| S-41 | (C₅H₅)₂–NCO–(CH₂)₈–CON(C₂H₅)₂ | 40.7 | 8.9 | 405 |
| S-42 | 4-CH₃-C₆H₄-SO₂N(C₄H₉(n))₂ | 49.65 | 10.4 | — |

Compounds represented by Formula[S-7]

| S-43 | 2,4-di-tert-butylphenol | 92 | 16.9 | — |

Compounds represented by Formula[S-8]

| S-44 | 2-(OC₈H₁₇(n))-C₆H₄-N(C₈H₁₇(n))₂ | 15.5 | 4.6 | — |
| S-45 | 2,4-(OCH₃)₂-C₆H₃-N(C₁₂H₂₅(n))₂ | 27.1 | 6.6 | — |
| S-46 | 2-(OCH₃)-C₆H₄-N(C₈H₁₇(n))₂ | 35.3 | 8.0 | — |
| S-47 | 2-(OC₄H₉(n))-5-(C₈H₁₇(t))-C₆H₃-N(C₄H₉(n))₂ | 79.14 | 15.0 | — |

Compounds represented by Formula[S-9]

| S-48 | 3-(C₈H₁₇(EH))-tetrahydrothiophene-1,1-dioxide | 37.62 | 8.4 | — |

-continued

| | | Viscosity (25° C.) | (mPa · s) (60° C.) | Boiling Point (° C.) |
|---|---|---|---|---|
| S-49 | 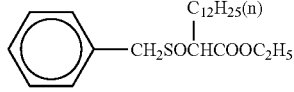 C₁₂H₂₅(n)<br>\|<br>⟨phenyl⟩—CH₂SOCHCOOC₂H₅ | 43.1 | 9.3 | — |
| Other Compounds | | | | |
| S-50 | C$_n$H$_{2n+1}$<br>(Mixture of normal-paraffin (n = 14, 15))<br>(for example, NP-SH manufactured by Mitsui Texaco Chemical Co.) | 2.47 | 0.4 | 260 |
| S-51 | 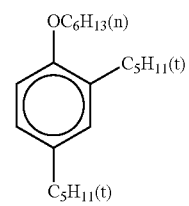 OC₆H₁₃(n), C₅H₁₁(t), C₅H₁₁(t) | 35.85 | 8.1 | 330 |
| S-52 | 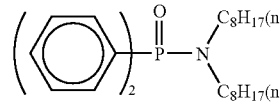 (Ph)₂P(=O)—N(C₈H₁₇(n))₂ | 45.9 | 9.8 | — |
| S-53 | 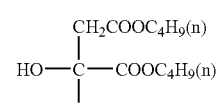 CH₂COOC₄H₉(n)<br>\|<br>HO—C—COOC₄H₉(n)<br>\|<br>CH₂COOC₄H₉(n) | 25.82 | 6.7 | — |

In the invention, the high-boiling point organic solvents may be used alone or in combination of two or more [e.g., combination of tricresyl phosphate and dibutyl phthalate, trioctyl phosphate and di(2-ethylhexyl)sebacate, or dibutyl phthalate and poly(N-t-butylacrylamide)].

In the invention, the mass ratio of the colorant to the high-boiling point organic solvent, colorant: high-boiling point organic solvent, is preferably 1:0.01 to 1:1 and more preferably 1:0.05 to 1:0.5.

Other examples of the high-boiling point organic solvents for use in the invention in addition to those above and/or the preparative methods for the high-boiling point organic solvents are described, for example, in U.S. Pat. Nos. 2,322,027, 2,533,514, 2,835,579, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321, and 5,013,639; European Patent Nos. 276,319A, 286,253A, 289,820A, 309,158A, 309,159A, 309,160A, 509, 311A, and 510,576A; East German Patent Nos. 147,009, 157, 147, 159,573, and 225,240A; British Patent 2,091,124A; JP-A Nos. 48-47335, 50-26530, 51-25133, 51-26036, 51-27921, 51-27922, 51-149028, 52-46816, 53-1520, 53-1521, 53-15127, 53-146622, 54-91325, 54-106228, 54-118246, 55-59464, 56-64333, 56-81836, 59-204041, 61-84641, 62-118345, 62-247364, 63-167357, 63-214744, 63-301941, 64-9452, 64-9454, 64-68745, 1-101543, 1-102454, 2-792, 2-4239, 2-43541, 4-29237, 4-30165, 4-232946, and 4-346338; and others.

(Storage Stabilizer)

In the invention, a storage stabilizer may be added to the multiple kinds of liquid, for suppression of undesirable polymerization of the liquids during storage. The storage stabilizer is preferably used in a liquid containing a polymerizable compound, and is preferably soluble in the liquid or other components in the liquid.

Examples of the storage stabilizers include quaternary ammonium salts, hydroxyamines, cyclic amides, nitrites, substituted ureas, heterocyclic compounds, organic acids, hydroquinone, hydroquinone monoethers, organic phosphines, copper compounds, and the like; and specific examples thereof include benzyltrimethylammonium chloride, diethylhydroxylamine, benzothiazole, 4-amino-2,2,6,6-tetramethylpiperidine, citric acid, hydroquinone monomethylether, hydroquinone monobutylether, copper naphthenate, and the like.

The amount of the storage stabilizer added is preferably, properly adjusted according to the activity of the polymerization initiator used, the reactivity of the polymerizable compound, and the kind of the storage stabilizer used, but is preferably 0.005 to 1 mass %, more preferably 0.01 to 0.5 mass %, and still more preferably 0.01 to 0.2 mass %, as solid matter in the liquid, form the viewpoints of the balance of storage stability and ink-curing efficiency when the liquids are mixed.

(Conductive Salts)

Conductive salts are solid compounds which dissolve in a liquid to heighten the conductivity of the liquid. In the invention, it is preferable to use substantially no conductive salts since the conductive salts are likely to precipitate during storage. However, an adequate amount of a conductive salt may be used if the solubility of the conductive salt in the liquid is high for the reason that the conductive salt or liquid component in the liquid has a high solubility. The conductive salt may be potassium thiocyanate, lithium nitrate, ammonium thiocyanate, or dimethylamine hydrochloride.

(Other Additives)

In addition, other known additives, such as polymer, surface-tension adjuster, ultraviolet absorbent, antioxidant, discoloration inhibitor, and pH adjuster, may also be used.

The surface-tension adjuster, ultraviolet absorbent, antioxidant, discoloration inhibitor, and pH adjuster can be properly selected from known compounds, and specific examples thereof are shown, for example, in JP-A No. 2001-181549.

Further, a pair of compounds that generate aggregate or increase the viscosity of the liquid when mixed and reacted with each other may be added respectively in different liquids. The pair of compounds form aggregate rapidly or increase the viscosity of the liquid rapidly, thus suppressing interference between adjacently ejected droplets more effectively.

Examples of the reactions of the pair of compounds that generate aggregate or increase the viscosity of the liquid when mixed and reacted with each other include acid and base reaction, hydrogen-bonding reaction by a carboxylic acid and amide group-containing compound, crosslinking reaction such as reaction of boronic acid and diol, reaction by electrostatic interaction between a cation and an anion, and the like.

<Inkjet-Recording Ink: the Third Embodiment of the Invention>

The inkjet-recording ink (the third embodiment of the invention) contains at least the above-mentioned high-boiling-point organic solvent and the above-mentioned metal compound. The inkjet-recording ink may further contain the above-mentioned polymerization initiator, but preferably substantially contains neither the above-mentioned colorant nor the above-mentioned polymerizable compound. That is, the compositions and embodiments which are favorable for the first liquid in the first embodiment of the invention can be applied to the inkjet-recording ink of the invention.

The inkjet-recording ink of the invention is preferably used as the first liquid of the inkjet-recording ink set (the first embodiment of the invention). Use of the inkjet-recording ink of the invention in this manner is effective in suppressing bleeding and interference between ejected droplets, similarly to the ink set described above.

<Inkjet Image-Recording Method: the Second Embodiment of the Invention>

Hereinafter, the inkjet image-recording method according to the invention will be described.

The inkjet image-recording method according to the invention (hereinafter, often referred to simply as "image-recording method") uses the above-mentioned ink set comprising multiple kinds of liquid including the first and second liquids, and comprises applying the first and second liquids onto a recording medium simultaneously or sequentially in such a manner that both the liquids are brought into contact with each other to thereby form an image.

By applying the first liquid containing a metal compound and the second liquid preferably containing a colorant so as to be brought into contact with each other, it is possible to effectively suppress bleeding and interference between ejected droplets and also obtain an image without color separation.

(Process of Applying Liquids)

In the image-recording method above, the multiple kinds of liquid including the first and second liquids do not always need to be applied onto a recording medium by ejection from inkjet nozzles and may be applied by other processes such as coating, but the second liquid containing a colorant is preferably applied onto a recording medium by ejection from inkjet nozzles, and more preferably, the second liquid is ejected from inkjet nozzles simultaneously with or after application of the first liquid, for suppression of bleeding and interference between ejected droplets.

The process of applying the first liquid onto a recording medium in the image-recording method will be described below. With respect to the process of applying the second liquid, ejection from inkjet nozzles (which is a preferable embodiment) as described above will be described as an example.

The application process is not particularly limited, and specific examples thereof include the following two processes.

(i) Coating Using a Coating Apparatus

In the inkjet image recording method according to the invention, an image is preferably formed by coating the first liquid on a recording medium using a coating apparatus and ejecting the second liquid thereon through an inkjet nozzle.

The coating apparatus is not particularly limited, and any of known coating apparatuses may be selected according to application, and examples thereof include an air doctor coater, blade coater, rod coater, knife coater, squeeze coater, impregnation coater, reverse roll coater, transfer roll coater, gravure coater, kiss roll coater, cast coater, spray coater, curtain coater, extrusion coater, and the like. Other coating methods are also described in Yuji Harasaki, "Coating Engineering".

The inkjet nozzle is also not particularly limited, and any of known nozzles may be selected according to application. Inkjet nozzles (Inkjet systems) are described in detail below.

The liquids other than the first and second liquids may be applied onto the recording medium by any process, for example, by coating using the coating apparatus or ejection from an inkjet nozzle, and the timing of application is also not particularly limited, but, if the liquid contains a colorant, the liquid is preferably ejected from an inkjet nozzle after the first liquid has been coated.

(ii) Ejection from Inkjet Nozzle

An image is preferably formed by ejecting the first liquid from an inkjet nozzle and ejecting the second liquid from an inkjet nozzle simultaneously with or after the ejection of the first liquid so as to come in contact with the first liquid.

The inkjet nozzle is the same as that described above.

Similarly to above, the liquids other than the first and second liquids may be applied onto the recording medium by any process, for example by coating using the coating apparatus or ejection from an inkjet nozzle, and the timing of application is also not particularly limited, but, if the liquid contains a colorant, the liquid is preferably ejected from an inkjet nozzle after the first liquid has been coated.

The inkjet-recording ink set according to the invention described below shows its advantageous effects more effectively, when used in the inkjet image-recording method wherein all other liquids are ejected from inkjet nozzles according to the process (ii).

The system of ejecting liquids from inkjet nozzles (inkjet-recording system) will be described below. Any of known systems such as an electric charge-control system of ejecting ink by using electrostatic attraction, drop-on-demand system (pressure pulse system) of using the vibrational pressure by a piezoelectric element, acoustic inkjet system of ejecting ink by using the acoustic radiation pressure generated by irradiation of acoustic beam converted from electrical signal on the ink, and thermal inkjet (Bubble Jet™) system of using the pressure generated by heating the ink and forming air bubble may be used favorably in the invention.

The inkjet-recording systems include a system of ejecting a lot of small volume droplets of a so-called photo ink having a low concentration, a system of using multiple inks that have substantially the same hue and a different concentration for improving image quality, and a system of using a transparent and colorless ink.

In the case of the process (i), an image is formed by ejecting at least the second liquid by the inkjet-recording system on a recording medium on which the first liquid has been coated. Alternatively in the case of the process (ii), an image is formed by ejecting at least the first and second liquids on a recording medium simultaneously or sequentially by the inkjet-recording system.

When two or more liquids are ejected onto a recording medium by the inkjet-recording system, these liquids are applied so as to be in contact with each other. The state of contact between the two or more liquids is not particularly limited, and the liquids may be ejected adjacently to each other or be ejected to overlap in the same area.

The timing of ejection is arbitrary and may be either simultaneous or sequential, but when the liquids are ejected sequentially, within 1 second after one of the liquids is ejected first, the next liquid is preferably ejected. The amount of the droplet is also not particularly limited, and is selected properly according to the intended sharpness of the image formed, but generally, the amount of the liquid per droplet is preferably, approximately 0.5 to 10 pl.

If the first liquid is ejected from an inkjet nozzle before the ejection of the second liquid in the process (ii), the first liquid comes in direct contact with the recording medium, resulting in generation of the interference between ejected droplets and giving an image of the ejected droplet irregular at the periphery. However, since the first liquid contains no colorant, the generation of interference between ejected droplets provides no problem.

In both the processes (i) and (ii), the second liquid is ejected onto the recording medium simultaneously with or after application of the first liquid so as to come in contact with the first liquid, and thus, no interference between ejected droplets is generated and the dot shape is preserved. For more favorable preservation of the dot shape, the first liquid, which is applied onto the recoding medium before the application of the second liquid, is preferably applied in a larger area than that of the second liquid to be ejected.

The balance of the amounts of respective liquids to be applied for one dot in an image-forming area, in the case of two-liquid type ink set, is such that the ratio (mass ratio per unit area) of the application amount of the first liquid with respect to the application amount of the second liquid is preferably in the range of 0.05 to 5, more preferably 0.07 to 1, and particularly preferably 0.1 to 1. When the ratio is 5 or less, it is possible to obtain an image quality favorable in relief impression. When the ratio is 0.05 or more, interference between ejected droplets can be sufficiently avoided, which is an advantageous effect of the invention.

Physical properties favorable for liquids (ink: first and second liquids in the first embodiment of the invention, or inkjet-recording ink in the second embodiment of the invention) ejected onto a recording medium by the inkjet-recording system may vary according to the printing machine used, but generally, the viscosity at 25° C. of each liquid is preferably 5 to 100 m Pa·s and more preferably 10 to 80 m Pa·s. The surface tension of each liquid is preferably 20 to 60 mN/m and more preferably 30 to 50 mN/m.

In addition, the difference in viscosity between the first and second liquids is preferably 25 m Pa·s or less, and the difference in surface tension between the first and second liquids is 20 mN/m or less.

(Energy-Applying Step)

The image-recording method may also have a step of fixing the image after image formation by applying activation energy for improving fixability. By application of activation energy, it is possible to accelerate polymerization and curing reaction in aggregate and form a stronger image more efficiently. The application of activation energy is preferably performed by photoirradiation or heating.

Formation of active species by decomposition of the polymerization inhibitor in the mixed liquid is accelerated by application of energy such as exposure to light or heating, and the increase in the amount of active species and in temperature accelerate polymerization and curing reaction of the polymerizable compound by the active species.

Ultraviolet or visible light may be used as the irradiation source for polymerization of the polymerizable compound in the invention. It is also possible to apply energy by irradiating a radiation ray other than light such as α-ray, γ-ray, X-ray, or electron beam, but among them, use of ultraviolet or visible light is preferable, and use of ultraviolet light is more preferable, from the points of cost and safety. The amount of energy needed for the curing reaction may vary according to the kind and content of the polymerization initiator, but is generally, approximately 1 to 500 mJ/cm$^2$.

During application of energy by heating, the recording medium surface is preferably heated under the condition of a temperature in the range of 40 to 80° C. for 0.1 to 1 second.

The recording medium may be heated by non-contact heating method, preferably, for example, by feeding the medium through a heating furnace such as oven, irradiating the entire-surface with UV, visible or infrared light, or the like. Examples of the light sources used for exposure as heating method include metal halide lamp, xenon lamp, tungsten lamp, carbon arc lamp, mercury lamp, and the like.

(Recording Medium)

Both an ink-penetrable recording medium and a non- or slow-ink-penetrable recording medium can be used in the invention. Examples of the ink-penetrable recording media include plain paper, inkjet-exclusive paper, coated paper, electrophotographic common-use paper, cloth, nonwoven fabric, porous film, polymer absorbent, and the like. These recording media are described as the "recording materials" in JP-A No. 2001-1891549 and others.

The advantageous effects of the invention are observed more distinctively on a non- or slow-ink-penetrable recording medium. Examples of the non- or slow-ink-penetrable recording media include art paper, synthetic resin, rubber, resin-coated paper, glass, metal, ceramics, wood, and the like. In addition, a composite material in combination of these materials may also be used for expression of other functions.

Any synthetic resins may be used as the synthetic resin, and examples thereof include polyesters such as polyethylene terephthalate and polybutadiene terephthalate, polyvinyl chloride, polystyrene, polyurethane, polyolefins such as polyethylene and polypropylene, acrylic resins, polycarbonate, acrylonitrile-butadiene-styrene copolymers, diacetate, triacetate, polyimide, cellophane, celluloid, and the like; and the thickness and shape of these synthetic resin base materials are not particularly limited, and the base material may be in the shape of film, card, or block. The synthetic resin may be transparent or opaque.

The synthetic resin is preferably used as in the shape of so-called soft packaging film, and various non-absorptive plastics and the films thereof may be used, and examples of the various plastic films include PET film, OPS film, OPP film, PNy film, PVC film, PE film, TAC film, and the like. Other plastics such as polycarbonate, acrylic resins, ABS, polyacetal, PVA, and rubbers may also be used.

Examples of the resin-coated papers include transparent polyester film, opaque polyester film, opaque polyolefin resin film, paper supports laminated with a polyolefin resin on both faces, and the like; and particularly preferable are the paper supports laminated with a polyolefin resin on both faces.

The metal may be any metal, and favorable examples thereof include aluminum, iron, gold, silver, copper, nickel, titanium, chromium, molybdenum, silicon, lead, and zinc, and the composites thereof such as stainless steel.

The supports for use in the inkjet image-recording method according to the invention include additionally, read-only optical disks such as CD-ROM and DVD-ROM, writable optical disks such as CD-R and DVD-R, rewritable optical disks, and the like; and an ink-receiving layer and a gross-finishing layer may be formed on the label surface side of these recording media.

EXAMPLES

Hereinafter, the present invention will be described in detail with reference to Examples, but it should be understood that the invention is not restricted by these Examples.

Example 1

1. Preparation of Second Liquid

| <Preparation of inkjet-recording liquid (I-1)> | | |
|---|---|---|
| (A) | Acid compound <compound (A-1), shown below> | 3.56 g |
| (B) | Polymerizable compound: DPCA60 (manufactured by Nippon Kayaku) | 1.07 g |
| (C) | Polymerizable compound: 1,6-hexanediol diacrylate (HDDA, manufactured by Daicel-UBC Co.) | 8.53 g |
| (D) | N-Ethyldiethanolamine | 0.29 g |
| (E) | Colorant <dye (M-1) shown below> | 0.46 g |

The components above were mixed and dissolved while being stirred, to give a magenta inkjet-recording liquid (I-1). The viscosity of the inkjet-recording liquid (I-1) at 25° C. was 19.6 m Pa·s. Hereinafter, each viscosity was determined at 25° C., and the value thereof was indicated.

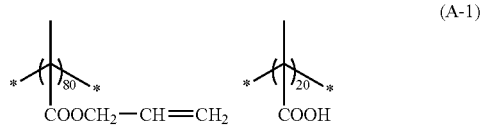
(A-1)

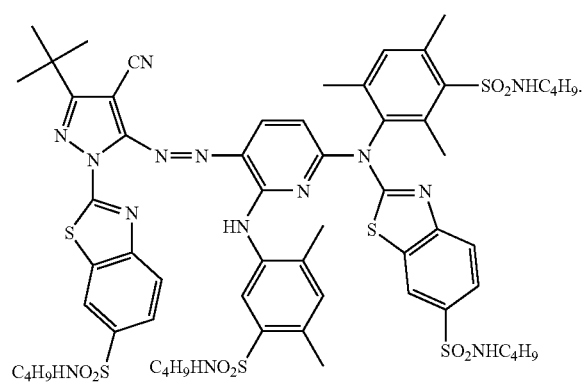
(M-1)

2. Preparation of First Liquid

| <Preparation of inkjet-recording liquid (II-1) containing a metal compound> | | |
|---|---|---|
| (F) | High-boiling point organic solvent (the specific example [S-6]) | 10 g |
| (G) | Polymerization initiator (TPO-L, the following (Initiator-1)) | 1.8 g |
| (H) | Metal compound according to the invention (the specific example 1-1) | 2 g |

The components above were mixed and dissolved while being stirred, to give an inkjet-recording liquid (II-1).

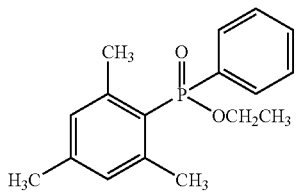
(Initiator 1)

<Preparation of Inkjet-Recording Liquids (II-2) to (II-9) Containing a Metal Compound>

Inkjet-recording liquids (II-2) to (II-9) containing a metal compound according to the invention were prepared in a similar manner to the inkjet-recording liquid (II-1), except that the metal compound used in preparing the inkjet-recording liquid (II-1) was replaced with the compound shown in the following Table 1 in the same amount.

The metal compound used in preparing the No. II liquids and the viscosity of each liquid are shown in Table 1.

TABLE 1

| | Metal compound | Viscosity (mPa · s) |
|---|---|---|
| II-1 | 1-1 | 15.6 |
| II-2 | 1-2 | 12.4 |
| II-3 | 1-6 | 13.8 |
| II-4 | 1-12 | 11.7 |
| II-5 | 2-10 | 12.9 |
| II-6 | 1-3 | 14.7 |
| II-7 | 1-14 | 16.9 |
| II-8 | 2-1 | 12.9 |
| II-9 | 2-2 | 13.5 |

3. Preparation of One-Liquid Type Ink

| <Preparation of comparative one-liquid type inkjet-recording liquid I-0> | | |
|---|---|---|
| (A) | Acid compound <compound (A-1)> | 3.56 g |
| (B) | Polymerizable compound: DPCA60 (manufactured by Nippon Kayaku) | 1.07 g |
| (C) | Polymerizable compound: 1,6-hexanediol diacrylate (HDDA, manufactured by Daicel-UBC Co.) | 7.67 g |
| (D) | N-Ethyldiethanolamine | 0.29 g |
| (E) | Colorant <dye (M-1)> | 0.46 g |
| (G) | Polymerization initiator (TPO-L, (Initiator-1)) | 1.81 g |

The components above were mixed and dissolved while being stirred, to give a magenta inkjet-recording liquid (I-0). The viscosity of the inkjet-recording liquid (I-0) was 19.6 mPa·s.

| <Preparation of comparative one-liquid type inkjet-recording liquid I-00> | | |
|---|---|---|
| (A) | Acid compound <compound (A-1)> | 3.56 g |
| (B) | Polymerizable compound: DPCA60 (manufactured by Nippon Kayaku) | 1.07 g |
| (C) | Polymerizable compound: 1,6-hexanediol diacrylate (HDDA, manufactured by Daicel-UBC Co.) | 9.53 g |
| (D) | N-Ethyldiethanolamine | 0.29 g |
| (E) | Colorant <dye (M-1)> | 0.46 g |
| (F) | High-boiling point organic solvent (specific example [S-6]) | 13.10 g |
| (G) | Polymerization initiator (TPO-L, (Initiator-1)) | 1.81 g |

The components above were mixed and dissolved while being stirred, to give an inkjet-recording liquid (I-00). The viscosity of the inkjet-recording liquid (I-00) was 19.6 mPa·s.

| <Preparation of one-liquid type inkjet-recording liquid I-000> | | |
|---|---|---|
| (A) | Acid compound <compound (A-1)> | 3.56 g |
| (B) | Polymerizable compound: DPCA60 (manufactured by Nippon Kayaku) | 1.07 g |
| (C) | Polymerizable compound: 1,6-hexanediol diacrylate (HDDA, manufactured by Daicel-UBC Co.) | 8.53 g |
| (D) | N-Ethyldiethanolamine | 0.29 g |
| (E) | Colorant <dye (M-1)> | 0.46 g |
| (F) | High-boiling point organic solvent (specific example [S-1]) | 10.10 g |
| (G) | Polymerization initiator (TPO-L, (Initiator-1)) | 1.81 g |
| (H) | Metal compound according to the invention (specific example 1-1) | 2 g |

Aggregate was formed in the comparative inkjet-recording liquid I-000 during preparation.

4. Evaluation

<Printing Method>

Printing by using a one-liquid type ink will be described first.

An image was printed on a recording medium by using the inkjet-recording liquid (1-0) prepared, in an inkjet printer (test machine manufactured by Microjet Ltd. (trade name: Inkjet Experiment System IJET1000R), with printing density: 300 dpi, ejection frequency: 2 KHz, and nozzle number: 64, 2 rows).

In addition, the inkjet-recording liquid (I-00) prepared was also used in printing, similarly to the inkjet-recording liquid (I-0). However, the ejection frequency was set to 4 KHz.

Printing by using a two-liquid type liquid will be described next.

Each of the inkjet-recording liquids (II-1) to (II-9) prepared was used in printing, in a similar manner to the inkjet-recording liquid (I-0). Then, in the combination shown in Table 2, the inkjet-recording liquid (I-1) was applied to be superimposed on the spot where each of the inkjet-recording liquids (II-1) to (II-9) was applied.

Each of the liquids was applied by an inkjet printer (test machine (trade name: Inkjet Experiment System IJET1000R), manufactured by Microjet Ltd., printing density: 300 dpi, ejection frequency: 2 KHz, and nozzle number: 64, 2 rows).

Each printing was carried out on both two kinds of recording media: a polyethylene terephthalate (PET) sheet having a thickness of 60 μm (trade name: PPL/laser-printer Xerox Film (OHP film), manufactured by Fuji Xerox Co., Ltd.) and an art paper (trade name: Tokuhishi Art double-faced, manufactured by Mitsubishi Paper Mills Ltd.).

After printing, each of the recording media was irradiated with an ultraviolet light at a wavelength of 365 nm from a metal halide lamp at an intensity of 500 mJ/cm$^2$ or less, to form an image. The image obtained was evaluated in the following tests.

<Evaluation of Interference Between Ejected Droplets>
(Line Quality)

In the printing process described above, each liquid was ejected in an overlapping state in the form of a line, and the overlapping state (degree of bleeding) of the ejected droplets was evaluated according to the following criteria. Specifically, in the ejection in an overlapping state in the form of a line, the first liquid was ejected in five lines so that the five lines were in contact with one another, and 10 seconds after the ejection of the first liquid, the second liquid was ejected thereon in one line. However, in the case of one-liquid type liquid (I-0) or (I-00), only its one liquid was ejected in the form of a line, and the degree of bleeding thereof was evaluated.

A: The line width is uniform.

B: There is a minute line width unevenness due to locally gathered liquid in a part of the line.

C: There is an obvious line width unevenness due to locally gathered liquid on the line.

(Solid Image Quality)

In the printing process above, each liquid was ejected in an overlapping state in the form of a solid image, and the degree of unevenness in density was evaluated according to the following criteria. Specifically, in the ejection in an overlapping state in the form of a solid image, the first liquid was ejected in sixty lines so that the sixty lines were in contact with one another, and 10 seconds after the ejection of the first liquid, the second liquid was ejected thereon in fifty lines so that the fifty lines were in contact with one another. However, in the case of one-liquid type liquid (I-0) or (I-00), only its one liquid was ejected in the form of a solid image, and the degree of unevenness in density was evaluated.

A: Almost no unevenness in density is observed.

B: Slight unevenness in density is observed, but without problem as a whole.

C: Unevenness in density is observed in the solid image, and the quality is inferior.

<Evaluation of Line Color Separation>

In the printing process above, each liquid was ejected in an overlapping state in the form of a line, and the color separation of the line was evaluated according to the following criteria. However, in the case of one-liquid type liquid (I-0) or (I-00), only its one liquid was ejected in the form of a line, and the color separation thereof was evaluated.

A: No color separation is observed.

B: Slight color separation is observed, and a slight missing part is observed in the center.

C: Distinct color separation is observed, and a thick missing part is observed in the center.

<Evaluation of Feeling of Wet (Rapid Drying Property)>

The image was touched with a finger and the degree of wet of the image was determined on the basis of the following criteria.

A: The image is not wet.

B: The image is slightly wet.

C: The image is considerably wet.

<Evaluation of Abrasion Resistance>

An image was printed on the PET sheet or art paper. 30 minutes after the printing, the printed image was reciprocatingly rubbed 10 times with an eraser, and the change after the rubbing was evaluated according to the following criteria.

A: Absolutely no color fade (no decrease in density).

B: Slight color fade.

C: Significant color fade.

<Evaluation of Light Resistance>

The PET sheet or art paper having an image formed thereon was exposed to xenon light (85000 Lux) by a weather meter (Atlas C.I65) for one week; the densities of the image before and after the irradiation were measured by X-rite310 densitometer (manufactured by X-rite); and the remaining colorant rate was calculated from the measurement results and evaluated according to the following criteria. The reflection density was measured at 1.0 or less.

A: Remaining colorant rate is 90% or more.

B: Remaining colorant rate is 80% or more but less than 90%.

C: Remaining colorant rate is 70% or more but less than 80%.

D: Remaining colorant rate is 50% or more but less than 70%.

E: Remaining colorant rate is less than 50%.

<Evaluation of Ozone Resistance>

The PET sheet or art paper having an image formed thereon was stored under the condition of an ozone concentration of 5.0 ppm for one week; the densities of the image before and after the storage was measured by X-rite310 densitometer (manufactured by X-rite); and the remaining colorant rate was calculated from the measurement results and evaluated according to the following criteria:

A: Remaining colorant rate is 90% or more.

B: Remaining colorant rate is 80% or more but less than 90%.

C: Remaining colorant rate is 70% or more but less than 80%.

D: Remaining colorant rate is 50% or more but less than 70%.

E: Remaining colorant rate is less than 50%.

The evaluation results are summarized in Table 2.

TABLE 2

| Inkjet-recording liquid | Recording medium | Line quality | Solid image quality | Line color separation | Feeling of wet | Abrasion resistance | Light resistance | Ozone resistance | Remarks |
|---|---|---|---|---|---|---|---|---|---|
| I-1/II-1 | PET | A | A | A | A | A | B | B | The invention |
|  | Art paper | A | A | A | A | A | B | B | The invention |
| I-1/II-2 | PET | A | A | A | A | A | B | B | The invention |
|  | Art paper | A | A | A | A | A | B | B | The invention |
| I-1/II-3 | PET | A | A | A | A | A | B | B | The invention |
|  | Art paper | A | A | A | A | A | B | B | The invention |
| I-1/II-4 | PET | A | A | A | A | A | B | B | The invention |
|  | Art paper | A | A | A | A | A | B | B | The invention |
| I-1/II-5 | PET | A | A | A | A | A | B | B | The invention |
|  | Art paper | A | A | A | A | A | B | B | The invention |
| I-1/II-6 | PET | A | B | A | A | A | B | B | The invention |
|  | Art paper | A | B | A | A | A | B | B | The invention |
| I-1/II-7 | PET | A | B | A | A | A | B | B | The invention |
|  | Art paper | A | B | A | A | A | B | B | The invention |
| I-1/II-8 | PET | A | B | A | A | A | B | B | The invention |
|  | Art paper | A | B | A | A | A | B | B | The invention |
| I-1/II-9 | PET | A | B | A | A | A | B | B | The invention |
|  | Art paper | A | B | A | A | A | B | B | The invention |

TABLE 2-continued

| Inkjet-recording liquid | Recording medium | Line quality | Solid image quality | Line color separation | Feeling of wet | Abrasion resistance | Light resistance | Ozone resistance | Remarks |
|---|---|---|---|---|---|---|---|---|---|
| I-0 | PET | C | C | A | A | A | B | B | Comparative Example |
|  | Art paper | B | C | A | A | A | B | B | Comparative Example |
| I-00 | PET | C | C | A | A | A | B | B | Comparative Example |
|  | Art paper | B | C | A | A | A | B | B | Comparative Example |

As is clear from Table 2, it is possible to rapidly form an image on a non-ink-absorbing PET sheet or an art paper without interference between ejected droplets or color separation, by applying two liquids as an ink-jet recording ink wherein one liquid contains a colorant and the other liquid contains a metal compound such that the two liquids overlap. It is also possible in the invention to accelerate the curing reaction efficiently and obtain an image which is superior in printability, not wet, highly resistant to abrasion, and superior in light resistance and ozone resistance, by using a metal halide lamp emitting a light having a wavelength of 365 nm and irradiating the ultraviolet light at a light intensity of up to 500 mJ/cm$^2$.

On the other hand, although it is possible to obtain an image which is not wet and is highly resistant to abrasion, and superior in light resistance and ozone resistance by using a one-liquid type liquid, use of the one-liquid type liquid is undesirable from the viewpoint of image quality, because there is interference between ejected droplets on the PET sheet or art paper and the image-forming property is insufficient.

The color separation above is a phenomenon wherein in a liquid containing fine particles of pigment etc., an excess stream is generated due to difference in temperature, difference in solvent concentration, difference in curing speed etc., and owing to difference in particle size, specific gravity or electric charge, there occurs a difference in mobility by which the pigment and the solvent (monomer) are separated from each other. In the case of ejection in the form of a line by an inkjet system, the color separation, if it occurs, leads to localization of the colorant in only the periphery of the droplet, leaving a missing part in the center.

Example 2

An experiment was carried out in the same manner as in the preparation of the second liquid in Example 1 except that phthalocyanine was used in place of the dye (M-1). The composition of the liquid containing a pigment is shown below.

| <Preparation of inkjet-recording liquid (III-1) containing a polymerizable compound> | |
|---|---|
| (A) Acid compound <compound (A-1)> | 0.22 g |
| (B) Polymerizable compound: DPCA60 (manufactured by Nippon Kayaku) | 0.38 g |
| (C) Polymerizable compound: 1,6-hexanediol diacrylate (HDDA manufactured by Daicel-UBC Co.) | 11.70 g |
| (D) N-Ethyldiethanolamine | 0.20 g |
| (E) Colorant <pigment: phthalocyanine> | 1.40 g |

(trade name: Irgulite Blue GLO, manufactured by Ciba Specialty Chemicals)

The components above were mixed and dispersed while being stirred, to give a cyan inkjet-recording liquid (III-1). The viscosity of the liquid (III-1) at 25° C. was 19.8 m Pa·s.

However, the pigment was added as a dispersion thereof in 1,6-hexanediol diacrylate in an amount of 20 mass %, which was previously dispersed together with a dispersant Solsperse 3200 (manufactured by Zeneca) by a ball mill (hard-glass ball mill pot, ball mill-rotary stand One-Stage A type: manufactured by Horie Shokai & Co., Ltd.). The addition amount of the dispersion was adjusted such that the pigment was added in the amount shown above.

| <Comparative one-liquid type ink-jet recording ink liquid III-0> | |
|---|---|
| (A) Acid compound <compound (A-1)> | 0.22 g |
| (B) Polymerizable compound: DPCA60 (manufactured by Nippon Kayaku) | 0.38 g |
| (C) Polymerizable compound: 1,6-hexanediol diacrylate (HDDA manufactured by Daicel-UBC Co.) | 10.89 g |
| (D) N-Ethyldiethanolamine | 0.20 g |
| (E) Colorant <pigment: phthalocyanine> (trade name: Irgulite Blue GLO, manufactured by Ciba Specialty Chemicals) | 1.40 g |
| (G) Polymerization initiator (TPO-L, (Initiator-1)) | 1.81 g |

The components above were mixed and dispersed while being stirred, to give a cyan inkjet-recording liquid (III-0). The viscosity of the inkjet-recording liquid (III-0) was 19.8 m Pa·s.

However, the pigment was added as a dispersion thereof in 1,6-hexanediol diacrylate in an amount of 20 mass %, which was previously dispersed together with a dispersant Solsperse 3200 (manufactured by Zeneca) by a ball mill (hard-glass ball mill pot, ball mill-rotary stand One-Stage A type: manufactured by Horie Shokai & Co., Ltd.). The addition amount of the dispersion was adjusted such that the pigment was added in the amount shown above.

<Comparative one-liquid type inkjet-recording ink liquid III-00>

| | | |
|---|---|---|
| (A) | Acid compound <compound (A-1)> | 0.22 g |
| (B) | Polymerizable compound: DPCA60 (manufactured by Nippon Kayaku) | 0.38 g |
| (C) | Polymerizable compound: 1,6-hexanediol diacrylate (HDDA manufactured by Daicel-UBC Co.) | 12.70 g |
| (D) | N-Ethyldiethanolamine | 0.20 g |
| (E) | Colorant <pigment: phthalocyanine> (trade name: Irgulite Blue GLO, manufactured by Ciba Specialty Chemicals) | 1.40 g |
| (F) | High-boiling point organic solvent (specific example [S-6]) | 13.10 g |
| (G) | Polymerization initiator (TPO-L, (Initiator-1)) | 1.81 g |

The components above were mixed and dispersed while being stirred, to give a cyan inkjet-recording liquid (III-00). The viscosity of the inkjet-recording liquid (III-00) was 19.8 m Pa·s.

However, the pigment was added as a dispersion thereof in 1,6-hexanediol diacrylate in an amount of 20 mass %, which was previously dispersed together with a dispersant Solsperse 3200 (manufactured by Zeneca) by a ball mill (hard-glass ball mill pot, ball mill-rotary stand One-Stage A type: manufactured by Horie Shokai & Co., Ltd.). The addition amount of the dispersion was adjusted such that the pigment was added in the amount shown above.

<Comparative one-liquid type ink-jet recording ink liquid III-000>

| | | |
|---|---|---|
| (A) | Acid compound <compound (A-1)> | 0.22 g |
| (B) | Polymerizable compound: DPCA60 (manufactured by Nippon Kayaku) | 0.38 g |
| (C) | Polymerizable compound: 1,6-hexanediol diacrylate (HDDA, manufactured by Daicel-UBC Co.) | 11.60 g |
| (D) | N-Ethyldiethanolamine | 0.20 g |
| (E) | Colorant <pigment: phthalocyanine> (trade name: Irgulite Blue GLO, manufactured by Ciba Specialty Chemicals) | 1.40 g |
| (F) | High-boiling point organic solvent (specific example [S-1]) | 10.10 g |
| (G) | Polymerization initiator (TPO-L, (Initiator-1)) | 1.81 g |
| (H) | Metal compound according to the invention (specific example 1-1) | 2 g |

Aggregate was formed during preparation of the comparative inkjet-recording liquid III-000.

An image was printed on a recording medium in a similar manner to Example 1, except that the inkjet-recording liquids (I-1), (I-0), and (I-00) used in Example 1 were replaced respectively with those (III-1), (III-0), and (III-00). The results are summarized in Table 3.

TABLE 3

| Inkjet-recording liquid | Recording medium | Line quality | Solid image quality | Line color separation | Feeling of wet | Abrasion resistance | Light resistance | Ozone resistance | Remarks |
|---|---|---|---|---|---|---|---|---|---|
| III-1/II-1 | PET | A | A | A | A | A | A | A | The invention |
| | Art paper | A | A | A | A | A | A | A | The invention |
| III-1/II-2 | PET | A | A | A | A | A | A | A | The invention |
| | Art paper | A | A | A | A | A | A | A | The invention |
| III-1/II-3 | PET | A | A | A | A | A | A | A | The invention |
| | Art paper | A | A | A | A | A | A | A | The invention |
| III-1/II-4 | PET | A | A | A | A | A | A | A | The invention |
| | Art paper | A | A | A | A | A | A | A | The invention |
| III-1/II-5 | PET | A | A | A | A | A | A | A | The invention |
| | Art paper | A | A | A | A | A | A | A | The invention |

TABLE 3-continued

| Inkjet-recording liquid | Recording medium | Line quality | Solid image quality | Line color separation | Feeling of wet | Abrasion resistance | Light resistance | Ozone resistance | Remarks |
|---|---|---|---|---|---|---|---|---|---|
| III-1/II-6 | PET | A | A | A | A | A | A | A | The invention |
|  | Art paper | A | A | A | A | A | A | A | The invention |
| III-1/II-7 | PET | A | A | A | A | A | A | A | The invention |
|  | Art paper | A | A | A | A | A | A | A | The invention |
| III-1/II-8 | PET | A | A | A | A | A | A | A | The invention |
|  | Art paper | A | A | A | A | A | A | A | The invention |
| III-1/II-9 | PET | A | A | A | A | A | A | A | The invention |
|  | Art paper | A | A | A | A | A | A | A | The invention |
| III-0 | PET | C | C | A | A | A | A | A | Comparative Example |
|  | Art paper | B | C | A | A | A | A | A | Comparative Example |
| III-00 | PET | C | C | A | A | A | A | A | Comparative Example |
|  | Art paper | B | C | A | A | A | A | A | Comparative Example |

As is clear from Table 3, it is possible to rapidly form an image on a non-ink-absorbing PET sheet or an art paper without interference between ejected droplets or color separation even when a pigment is used as the colorant, by applying two liquids as an ink-jet recording ink wherein one liquid contains a colorant and the other liquid contains a metal compound such that the two liquids overlap each other. It is also possible in the invention to accelerate the curing reaction efficiently and obtain an image which is superior in printability, not wet, highly resistant to abrasion, and superior in light resistance and ozone resistance, by using a metal halide lamp emitting a light having a wavelength of 365 nm and irradiating the ultraviolet light at a light intensity of up to 500 mJ/cm$^2$.

In addition, when a pigment is used, not only the light resistance and ozone resistance is further improved but also an image without unevenness can be obtained even when using the metal compound with which slight unevenness of the image was observed.

Example 3

An image was formed and evaluated in a similar manner to Example 2, except that two-liquid type inkjet-recording liquids (III-1) and (II-1) to (II-9) among the liquids prepared in Example 2 were used and the liquids (II-1) to (II-9) were applied onto the recording medium by coating with a rod coater (manufactured by Matsubo Corp.). Evaluation results similar to those of Example 2 were obtained.

Example 4

<Preparation of Inkjet-Recording Liquids (IV-1) to (IV-9) Containing a Metal Compound>

Inkjet-recording liquids (IV-1) to (IV-9) were prepared in a similar manner to the liquids (II-1) to (II-9) in Example 2, except that the high-boiling-point organic solvent was eliminated and the amount of the metal compound according to the invention was changed to 11.8 g.

An image was printed and evaluated in a similar manner to Example 3, except that the inkjet-recording liquids (II-1) to (II-9) were replaced respectively with inkjet-recording liquids (IV-1) to (IV-9). In this case too, advantageous effects similar to those of Example 3 were obtained.

Comparative Example

Corresponding to Japanese Patent No. 3478495

An inkjet-recording liquid having the following composition was prepared and evaluated in a similar manner to Example 1. Results are summarized in Table 4.

| <Comparative inkjet-recording liquid I-X> | |
|---|---|
| (A) Unidic SI-929 (manufactured by Dainippon Ink and Chemicals, Inc.) | 20 g |
| (B) Dye X | 1.5 g |
| (C) Water | 68.5 cc |
| (D) Glycerin (manufactured by Wako Pure Chemical Industries) | 10 g |

| <Comparative inkjet-recording liquid II-X> | |
|---|---|
| (A) Water | 97 cc |
| (B) Dyrocure 2529 (manufactured by Merck & Co., Inc.) | 3 g |

Dye X

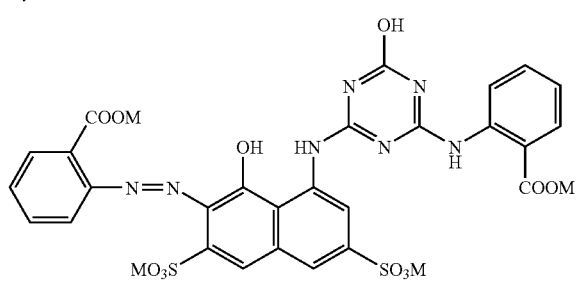

TABLE 4

| Inkjet-recording liquid | Recording medium | Line quality | Solid image quality | Line color separation | Feeling of wet | Abrasion resistance | Light resistance | Ozone resistance | Remarks |
|---|---|---|---|---|---|---|---|---|---|
| I-X/II-X | PET | C | C | A | A | A | C | C | Comparative Example |
|  | Art paper | C | C | A | A | A | C | C | Comparative Example |

As is clear from Table 4, when using a recording method of using an ink wherein one liquid contains a photo-curing resin and the other liquid contains a photopolymerization initiator, in the case of using no metal compound according to the invention and using water as the solvent, the results are such that the line width is uneven, the solid image is uneven in density, the light resistance and ozone resistance are inferior, and color separation occurs.

Example 5

Although only the second liquid contained a polymerizable compound in Example 1, both the first and second liquids contained a polymerizable compound in Example 5; and an ink was prepared and evaluated in a similar manner to Example 1. In addition, the experiment was conducted while the polymerizable compound used in the second liquid was changed. The compositions of the first and second liquids used in Example 5 are as follows:

1. Preparation of Second Liquid

<Preparation of inkjet-recording liquid (I'-1)>

| | | |
|---|---|---|
| (A) | Acid compound [compound (A-1)] | 3.56 g |
| (B) | Polymerizable compound: DPCA60 (manufactured by Nippon Kayaku) | 0.87 g |
| (C) | Polymerizable compound: 1,6-hexanediol diacrylate (HDDA; manufactured by Daicel-UBC) | 6.93 g |
| (D) | N-Ethyldiethanolamine | 0.29 g |
| (E) | Colorant [dye (M-1)] | 0.46 g |
| (F) | Polymerization initiator (TPO-L, Initiator-1) | 1.8 g |

The components above were blended and dissolved while being stirred, to give a magenta inkjet-recording liquid (I'-1). The viscosity of the inkjet-recording liquid (I'-1) at 25° C. was 19.6 cP. The viscosities indicated below were viscosities determined at 25° C.

<Preparation of inkjet-recording liquid (I'-11)>
In this case, a part of the polymerizable compounds used in inkjet-recording liquid (I'-1) was changed

| | | |
|---|---|---|
| (A) | Acid compound [the compound (A-1)] | 3.56 g |
| (B) | Polymerizable compound: DPCA-60 (manufactured by Nippon Kayaku) | 0.87 g |
| (C) | Polymerizable compound: ACMO (manufactured by Kohjin) | 6.93 g |
| (D) | N-Ethyldiethanolamine | 0.29 g |
| (E) | Colorant [dye (M-1)] | 0.46 g |
| (F) | Polymerization initiator (TPO-L, Initiator-1) | 1.8 g |

The components above were blended and dissolved while being stirred, to give a magenta inkjet-recording liquid (I'-11). The viscosity of the inkjet-recording liquid (I'-11) at 25° C. was 23.5 cP.

2. Preparation of First Liquid

<Preparation of an inkjet-recording liquid (II-31) containing a metal compound according to the invention>

| | | |
|---|---|---|
| (G) | High-boiling-point organic solvent (specific example S-32) | 2 g |
| (H) | Polymerization initiator (TPO-L, Initiator-1) | 1.8 g |
| (I) | Metal compound according to the invention (specific example 1-1) | 2 g |

| -continued |
| --- |
| <Preparation of an inkjet-recording liquid (II-31) containing a metal compound according to the invention> |

| | | |
| --- | --- | --- |
| (J) | Polymerizable compound: DPCA60 (manufactured by Nippon Kayaku) | 1.1 g |
| (K) | Polymerizable compound: 1,6-hexanediol diacrylate (HDDA; manufactured by Daicel-UBC) | 8.7 g |

<Preparation of Inkjet-Recording Liquid (II-32) Containing a Metal Compound According to the Invention>

An inkjet-recording liquid containing a metal compound according to the invention (II-32) was prepared in a similar manner to the inkjet-recording liquid (II-31), except that the metal compound according to the invention was replaced with the compound shown in the following Table 5 in the same amount.

| <Preparation of inkjet-recording liquid (II-41) containing a metal compound according to the invention> |
| --- |

| | | |
| --- | --- | --- |
| (G) | High-boiling-point organic solvent (specific example S-1) | 2 g |
| (H) | Polymerization initiator (TPO-L, Initiator-1) | 1.8 g |
| (I) | Metal compound according to the invention (specific example 1-1) | 2 g |
| (J) | Polymerizable compound: DPCA-60 (manufactured by Nippon Kayaku) | 1.1 g |
| (K) | Polymerizable compound: ACMO (manufactured by Kohjin) | 8.7 g |

<Preparation of Inkjet-Recording Liquid (II-42) Containing a Metal Compound According to the Invention>

An inkjet-recording liquid containing no colorant (II-42) was prepared in a similar manner to the inkjet-recording liquid (II-41), except that the metal compound according to the invention was replaced with the compound shown in the following Table 5 in the same amount.

Table 5 shows the kinds of the metal compound and the polymerizable compound used in preparation of the first liquid and the viscosity of the first liquid at 25° C.

TABLE 5

| Number of specific example (metal compound) | Polymerizable compounds | Viscosity (cP) |
| --- | --- | --- |
| II-31 | 1-1 | DPCA60/HDDA | 19.6 |
| II-32 | 2-10 | DPCA60/HDDA | 19.6 |

TABLE 5-continued

| Number of specific example (metal compound) | Polymerizable compounds | Viscosity (cP) |
| --- | --- | --- |
| II-41 | 1-1 | DPCA60/ACMO | 23.5 |
| II-42 | 2-10 | DPCA60/ACMO | 23.5 |

An image was printed on a recording medium in a similar manner to Example 1, except that the inkjet-recording liquids (I-1), (I-0), (I-00) used in Example 1 were replaced respectively with (I'-1) and (I'-11) and the inkjet-recording liquids (II-1) to (II-9) were replaced respectively with (II-31), (II-32), (II-41), and (II-42), and the printed image was evaluated. The results are summarized in Table 6.

TABLE 6

| Inkjet-recording liquid | Recording medium | Line quality | Solid image quality | Line color separation | Feeling of wet | Abrasion resistance | Light resistance | Ozone resistance | Remarks |
| --- | --- | --- | --- | --- | --- | --- | --- | --- | --- |
| I'-1/II-31 | PET | A | A | A | A | A | B | B | The invention |
| | Art paper | A | A | A | A | A | B | B | The invention |
| I'-1/II-32 | PET | A | A | A | A | A | B | B | The invention |
| | Art paper | A | A | A | A | A | B | B | The invention |
| I'-11/II-41 | PET | A | A | A | A | A | B | B | The invention |
| | Art paper | A | A | A | A | A | B | B | The invention |
| I'-11/II-42 | PET | A | A | A | A | A | B | B | The invention |
| | Art paper | A | A | A | A | A | B | B | The invention |

As is clear from Table 6, when using two-liquid type inkjet-recording liquids wherein one liquid contains a colorant, the other liquid contains a metal compound according to the invention, and both liquids contains a polymerizable compound, and applying the two liquids so as to overlap each other, it is possible to rapidly form an image on an non-ink-absorbing PET sheet or an art paper without interference between ejected droplets or color separation. It is also possible in the invention to accelerate the curing reaction efficiently and obtain an image which is superior in printability, not wet, highly resistant to abrasion, and superior in light resistance and ozone resistance, by using a metal halide lamp emitting a light having a wavelength of 365 nm and irradiating the ultraviolet light at a light intensity of up to 500 mJ/cm$^2$.

Nozzle clogging was observed when ink-jet recording was performed for an extended period of time by using an ink composition containing both the polymerizable compound and the polymerization initiator. The nozzle clogging was suppressed when using an ink containing a polymerizable compound, a polymerization initiator as well as a colorant.

Example 6

An experiment was done in a similar manner to Example 5, except that the dye (M-1) used in preparation of the second liquid in Example 5 was replaced with a phthalocyanine pigment and the polymerization initiator was eliminated in preparation of the first liquid. The composition of the liquid using a pigment is shown below.

1. Preparation of Second Liquid

| <Preparation of inkjet-recording liquid (III'-1)> | |
|---|---|
| (A) Acid compound [compound (A-1)] | 0.22 g |
| (B) Polymerizable compound: DPCA60 (manufactured by Nippon Kayaku) | 0.32 g |
| (C) Polymerizable compound: 1,6-hexanediol diacrylate (HDDA, manufactured by Daicel-UBC Co.) | 9.86 g |
| (D) N-Ethyldiethanolamine | 0.20 g |
| (E) Colorant [pigment: copper phthalocyanine (PB15:3)] (trade name: Irgulite Blue GLO, manufactured by Ciba Specialty Chemicals) | 1.40 g |
| (F) Polymerization initiator (TPO-L, Initiator-1) | 1.8 g |

The components above were mixed, dissolved and dispersed while being stirred, to give a cyan inkjet-recording liquid (III'-1). The viscosity of the liquid (III'-1) at 25° C. was 19.8 m Pa·s.

However, the pigment was added as a dispersion thereof in 1,6-hexanediol diacrylate in an amount of 20 mass %, which was previously dispersed together with a dispersant Solsperse 3200 (manufactured by Zeneca) by a ball mill (hard-glass ball mill pot, ball mill-rotary stand One-Stage A type: manufactured by Horie Shokai & Co., Ltd.). The addition amount of the dispersion was adjusted such that the pigment was added in the amount shown above.

| <Preparation of inkjet-recording liquid (III'-2)> | |
|---|---|
| (A) Acid compound [compound (A-1)] | 0.22 g |
| (B) Polymerizable compound: DPCA60 (manufactured by Nippon Kayaku) | 0.32 g |
| (C) Polymerizable compound: ACMO (manufactured by Kohjin) | 9.86 g |
| (D) N-Ethyldiethanolamine | 0.20 g |
| (E) Colorant (pigment: phthalocyanine) (trade name: Irgulite Blue GLO, manufactured by Ciba Specialty Chemicals) | 1.40 g |
| (F) Polymerization initiator (TPO-L, Initiator-1) | 1.8 g |

The components above were blended and dispersed while being stirred, to give a cyan inkjet-recording liquid (III'-2). The viscosity of the inkjet-recording liquid (III'-2) at 25° C. was 23.5 cP.

However, the pigment was previously dispersed in 1,6-hexanediol diacrylate in an amount of 20 mass % by using a dispersant Solsperse 3200 (manufactured by Zeneca) by a ball mill (hard-glass ball mill pot, one-stage ball-mill-rotating table, Model A: manufactured by Horie Shokai & Co., Ltd.), and then added. The pigment was added in the amount shown above.

2. Preparation of First Liquid

| <Preparation of inkjet-recording liquid (II'-31) containing a metal compound according to the invention> | |
|---|---|
| (G) High-boiling-point organic solvent (specific example S-32) | 2 g |
| (I) Metal compound according to the invention (specific example 1-1) | 2 g |
| (J) Polymerizable compound: DPCA60 (manufactured by Nippon Kayaku) | 1.1 g |
| (K) Polymerizable compound: 1,6-hexanediol diacrylate (HDDA; manufactured by Daicel-UBC) | 10.5 g |

<Preparation of Inkjet-Recording Liquid (II'-32) Containing a Metal Compound According to the Invention>

An inkjet-recording liquid (II'-32) containing a metal compound according to the invention was prepared in a similar manner to inkjet-recording liquid (II'-31), except that the metal compound according to the invention used in preparation of the inkjet-recording liquid (II'-31) was replaced with the compound shown in the following Table 7 in the same amount.

| <Preparation of inkjet-recording liquid (II'-41) containing a metal compound according to the invention> | |
|---|---|
| (G) High-boiling-point organic solvent (specific example S-1) | 2 g |
| (I) Metal compound according to the invention (specific example 1-1) | 2 g |
| (J) Polymerizable compound: DPCA-60 (manufactured by Nippon Kayaku) | 1.1 g |
| (K) Polymerizable compound: ACMO (manufactured by Kohjin) | 10.5 g |

<Preparation of Inkjet-Recording Liquid (II'-42) Containing a Metal Compound According to the Invention>

An inkjet-recording liquid (II'-42) containing no colorant was prepared in a similar manner to inkjet-recording liquid (II'-41), except that the metal compound according to the invention used in preparation of the inkjet-recording liquid (II'-41) was replaced with the compound shown in the following Table 7 in the same amount.

Table 7 shows the kinds of the metal compounds and polymerizable compounds used in preparation of the first liquid and the viscosity of the first liquid at 25° C.

TABLE 7

| | Number of specific example (metal compound) | Polymerizable compounds | Viscosity (cP) |
|---|---|---|---|
| II'-31 | 1-1 | DPCA60/HDDA | 19.6 |
| II'-32 | 2-10 | DPCA60/HDDA | 19.6 |
| II'-41 | 1-1 | DPCA60/ACMO | 23.5 |
| II'-42 | 2-10 | DPCA60/ACMO | 23.5 |

An image was formed on a recording medium in a similar manner to Example 5, except that the inkjet-recording liquids (I'-1) and (I'-11) used in Example 5 were replaced respectively with the liquids (III'-1) and (III'-2) and the inkjet-recording liquids (II-31), (II-32), (II-41), and (II-42) were replaced respectively with (II'-31), (II'-32), (II'-41), and (II'-42), and the printed image was evaluated. The results are summarized in Table 8.

TABLE 8

| Inkjet-recording liquid | Recording medium | Line quality | Solid image quality | Line color separation | Feeling of wet | Abrasion resistance | Light resistance | Ozone resistance | Remarks |
|---|---|---|---|---|---|---|---|---|---|
| III'-1/II'-31 | PET | A | A | A | A | A | A | A | The invention |
| | Art paper | A | A | A | A | A | A | A | The invention |
| III'-1/II'-32 | PET | A | A | A | A | A | A | A | The invention |
| | Art paper | A | A | A | A | A | A | A | The invention |
| III'-2/II'-41 | PET | A | A | A | A | A | A | A | The invention |
| | Art paper | A | A | A | A | A | A | A | The invention |
| III'-2/II'-42 | PET | A | A | A | A | A | A | A | The invention |
| | Art paper | A | A | A | A | A | A | A | The invention |

As is clear from Table 8, when using two-liquid type inkjet-recording liquids wherein one liquid contains a colorant, the other liquid contains a metal compound according to the invention, and both liquids contains a polymerizable compound, and applying the two liquids so as to overlap each other, in the case of using a pigment as the colorant, it is possible to rapidly form an image on an non-ink-absorbing PET sheet or an art paper without interference between ejected droplets or color separation. It is also possible in the invention to accelerate the curing reaction efficiently and obtain an image which is superior in printability, not wet, highly resistant to abrasion, and superior in light resistance and ozone resistance, by using a metal halide lamp emitting a light having a wavelength of 365 nm and irradiating the ultraviolet light at a light intensity of up to 500 mJ/cm$^2$.

Further, when a pigment is used, it is possible to give an image further improved in light resistance and ozone resistance without unevenness.

Example 7

An image was formed on a recording medium in a similar manner to Example 6, except that the two-liquid type inkjet-recording liquids (III'-1), (II'-31) and (II'-32) were used among the liquids prepared in Example 6 and the liquids (II'-31) and (II'-32) were applied onto the recording medium by coating using a rod coater (manufactured by Matsubo Corp.), and the printed image was evaluated. Results similar to those in Example 6 were obtained.

Example 8

<Preparation of Inkjet-Recording Liquids (IV-31) and (IV-32) Containing a Metal Compound>According to the Invention Inkjet-recording liquids (IV-31) and (IV-32) were prepared in a similar manner to Example 5, except that the high-boiling-point organic solvent used in preparation of the liquids (II-31) and (II-32) in Example 5 was eliminated and the amount of the metal compound according to the invention used is changed to 12 g.

Then, a sample was prepared in a similar manner to Example 7, except that the inkjet-recording liquids (II'-31) and (II'-32) used in Example 7 were replaced with the inkjet-recording liquids (IV-31) and (IV-32). The sample obtained was evaluated in a similar manner to Example 7, giving favorable results similar to those in Example 7.

As is clear from the above description, the present invention can provide the following embodiments 1 to 26.

1. An inkjet-recording ink set comprising multiple kinds of liquid including at least first and second liquids, wherein the first liquid contains a metal compound dissolved therein, and at least one of the multiple kinds of liquid contains a polymerizable compound.

2. The inkjet-recording ink set of embodiment 1, wherein the metal compound is a metal salt of an aliphatic carboxylic acid or a 1,3-diketone metal compound.

3. The inkjet-recording ink set of embodiment 1 or 2, wherein the metal in the metal compound is at least one metal selected from the group consisting of zinc, aluminum, calcium, magnesium, iron, cobalt, nickel, and copper.

4. The inkjet-recording ink set of any one of embodiments 1 to 3, wherein the first liquid contains substantially no colorant.

5. The inkjet-recording ink set of any one of embodiments 1 to 4, wherein the second liquid contains a colorant.

6. The inkjet-recording ink set of any one of embodiments 1 to 5, wherein the second liquid contains substantially no metal compound.

7. The inkjet-recording ink set of any one of embodiments 1 to 6, wherein the second liquid contains a polymerizable compound.

8. The inkjet-recording ink set of any one of embodiments 1 to 6, wherein each of the first and second liquids contains a polymerizable compound.

9. The inkjet-recording ink set of any one of embodiments 1 to 8, wherein at least one of liquids containing the metal compound contains a high-boiling-point organic solvent.

10. The inkjet-recording ink set of any one of embodiments 1 to 9, wherein when any one of the multiple kinds of liquid contains a solvent, the solvent contains substantially no water-soluble liquid.

11. The inkjet-recording ink set of embodiment 9 or 10, wherein the high-boiling-point organic solvent has a boiling point of 100° C. or higher.

12. The inkjet-recording ink set of any one of embodiments 5 to 11, wherein the colorant is an oil soluble dye or a pigment.

13. The inkjet-recording ink set of embodiment 12, wherein the colorant is a pigment.

14. An inkjet image-recording method using the inkjet-recording ink set of any one of embodiments 1 to 13, the method comprising applying the first and second liquids onto a recording medium simultaneously or sequentially in such a manner that both the liquids are brought into contact with each other to thereby form an image.

15. The inkjet image-recording method of embodiment 14, wherein the image is formed by ejecting the second liquid through an inkjet nozzle either simultaneously with or after application of the first liquid onto a recording medium.

16. The inkjet image-recording method of embodiment 14 or 15, wherein the application of the first liquid onto a recording medium is carried out by coating using a coating apparatus, and the second liquid is ejected through an inkjet nozzle after the coating of the first liquid.

17. The inkjet image-recording method of embodiment 14 or 15, wherein the application of each of the first and second liquids onto a recording medium is carried out by ejection through an inkjet nozzle.

18. The inkjet image-recording method of any one of embodiments 14 to 17, further comprising fixing the image formed on a recording medium by application of energy.

19. The inkjet image-recording method of embodiment 18, wherein the energy is applied by photoirradiation or heating.

20. An inkjet-recording ink comprising at least a high-boiling-point organic solvent and a metal compound.

21. The inkjet-recording ink of embodiment 20, wherein the metal compound is a metal salt of an aliphatic carboxylic acid or a 1,3-diketone metal compound.

22. The inkjet-recording ink of embodiment 20 or 21, wherein the metal in the metal compound is at least one metal selected from the group consisting of zinc, aluminum, calcium, magnesium, iron, cobalt, nickel, and copper.

23. The inkjet-recording ink of any one of embodiments 20 to 22, further comprising a polymerization initiator.

24. The inkjet-recording ink of any one of embodiments 20 to 23, comprising substantially no colorant.

25. The inkjet-recording ink of any one of embodiments 20 to 24, comprising substantially no polymerizable compound.

26. The inkjet-recording ink of any one of embodiments 20 to 25, which is used for an inkjet-recording ink set comprising multiple kinds of liquid including at least one liquid containing a polymerizable compound.

Therefore, the invention can provide an inkjet-recording ink set and an inkjet-recording ink which are capable of suppressing bleeding and interference between adjacently ejected ink droplets as well as maintaining long-term storage stability and superior fixability to form a high quality image. Further, the invention can provide an inkjet image recording method which is capable of suppressing bleeding and interference between adjacently ejected ink droplets as well as maintaining superior fixability to form a high quality image.

The disclosures of Japanese Patent Application Nos. 2005-105144 and 2006-14292 are incorporated herein by reference in their entireties.

All publications, patent applications, and technical standards mentioned in this specification are herein incorporated by reference to the same extent as if each individual publication, patent application, or technical standard was specifically and individually indicated to be incorporated by reference.

INDUSTRIAL APPLICABILITY

The present invention can provide an inkjet-recording ink set and an inkjet-recording ink which are capable of suppressing bleeding and interference between adjacently ejected ink droplets as well as maintaining long-term storage stability and superior fixability to form a high quality image. Further, the invention can provide an inkjet image recording method which is capable of suppressing bleeding and interference between adjacently ejected ink droplets as well as maintaining superior fixability to form a high quality image.

The invention claimed is:

1. An inkjet image-recording method using an inkjet-recording ink set comprising multiple kinds of liquid including at least first and second liquids, wherein the first liquid contains a metal compound dissolved therein, at least one of the multiple kinds of liquid contains a polymerizable compound and at least one of the multiple kinds of liquid contains a high-boiling-point organic solvent, in which solubility of water at 25° C. is 4 g or less, wherein the multiple kinds of liquid contain substantially no water and no low-boiling-point organic solvent, the method comprising applying the first and second liquids onto a recording medium simultaneously or sequentially in such a manner that both the liquids are brought into contact with each other to thereby form an image and fixing the image formed on a recording medium by application of energy.

2. The inkjet image-recording method of claim 1, wherein the metal compound is a metal salt of an aliphatic carboxylic acid or a 1,3-diketone metal compound.

3. The inkjet image-recording method of claim 1, wherein the metal in the metal compound is at least one metal selected from the group consisting of zinc, aluminum, calcium, magnesium, iron, cobalt, nickel, and copper.

4. The inkjet image-recording method of claim 1, wherein the first liquid contains substantially no colorant.

5. The inkjet image-recording method of claim 1, wherein the second liquid contains a colorant.

6. The inkjet image-recording method of claim 1, wherein the second liquid contains a polymerizable compound.

7. The inkjet image-recording method of claim 1, wherein at least one of liquids containing the metal compound contains a high-boiling-point organic solvent.

8. The inkjet image-recording method of claim 1, wherein when any one of the multiple kinds of liquid contains a solvent, the solvent contains substantially no water-soluble liquid.

9. The inkjet image-recording method of claim 5, wherein the colorant is a pigment.

10. The inkjet image-recording method of claim 1, wherein the image is formed by ejecting the second liquid through an inkjet nozzle either simultaneously with or after application of the first liquid onto a recording medium.

11. The inkjet image-recording method of claim 1, wherein the application of the first liquid onto the recording medium is carried out by coating using a coating apparatus, and the second liquid is ejected through an inkjet nozzle after the coating of the first liquid.

12. The inkjet image-recording method of claim 1, wherein the application of each of the first and second liquids onto the recording medium is carried out by ejection through an inkjet nozzle.

13. The inkjet image-recording method of claim 1, wherein the high-boiling-point organic solvent is a solvent selected from the group consisting of compounds represented by the following Formulae [S-1] to [S-9]:

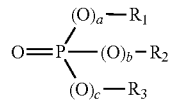

Formula [S-1]

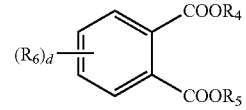

Formula [S-2]

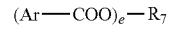

Formula [S-3]

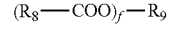

Formula [S-4]

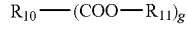

Formula [S-5]

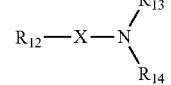

Formula [S-6]

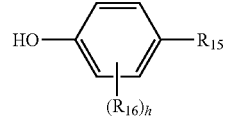

Formula [S-7]

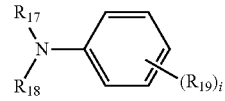

Formula [S-8]

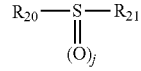

Formula [S-9]

wherein, in Formula [S-1] above, $R_1$, $R_2$ and $R_3$ each independently represent an aliphatic or aryl group; and each of a, b, and c is independently 0 or 1, in Formula [S-2], $R_4$ and $R_5$ each independently represent an aliphatic or aryl group; $R_6$ represents a halogen atom, or an alkyl, alkoxy, aryloxy, alkoxycarbonyl or aryloxycarbonyl group; and d is an integer of 0 to 3, in Formula [S-3], Ar represents an aryl group; e is an integer of 1 to 6; and $R_7$ represents an e-valent hydrocarbon group or an e-valent group wherein hydrocarbon groups are linked to each other via ether bonds, in Formula [S-4], $R_8$ represents an aliphatic group; f is an integer of 1 to 6; and $R_9$ represents an f-valent hydrocarbon group or an f-valent group wherein hydrocarbon groups are linked to each other via ether bonds, in Formula [S-5], g is an integer of 2 to 6; $R_{10}$ represents a g-valent hydrocarbon group (excluding an aryl group); and $R_{11}$ represents an aliphatic or aryl group, in Formula [S-6], $R_{12}$, $R_{13}$ and $R_{14}$ each independently represent a hydrogen atom, or an aliphatic or aryl group; X represents —CO— or —SO$_2$—; and $R_{12}$ and $R_{13}$, or $R_{13}$ and $R_{14}$ may bind to each other, forming a ring, in Formula [S-7], $R_{15}$ represents an aliphatic, alkoxycarbonyl, aryloxycarbonyl, alkylsulfonyl, arylsulfonyl, aryl or cyano group; $R_{16}$ represents a halogen atom or an aliphatic, aryl, alkoxy or aryloxy group; and h is an integer of 0 to 3, in Formula [S-8], $R_{17}$ and $R_{18}$ each independently represent an aliphatic or aryl group; $R_{19}$ represents a halogen atom or an aliphatic, aryl, alkoxy or aryloxy group; and i is an integer of 0 to 5, and in Formula [S-9], $R_{20}$ and $R_{21}$ each independently represent an aliphatic or aryl group; j is 1 or 2; and $R_{20}$ and $R_{21}$ may bind to each other, forming a ring.

14. The inkjet image-recording method of claim 1, wherein an amount of the high-boiling-point organic solvent added to the liquid is in the range of 50% by mass to 100% by mass.

15. The inkjet image-recording method of claim 2, wherein the metal compound is a 1,3-diketone metal compound.

16. The inkjet image-recording method of claim 1, wherein the multiple kinds of liquid are three liquids.

* * * * *